US006865294B2

(12) United States Patent
Sato

(10) Patent No.: US 6,865,294 B2
(45) Date of Patent: Mar. 8, 2005

(54) IMAGE REPRODUCING APPARATUS, IMAGE REPRODUCING METHOD, AND COMPUTER READABLE STORAGE MEDIUM

(75) Inventor: Kazuhiko Sato, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 828 days.

(21) Appl. No.: 09/816,135

(22) Filed: Mar. 26, 2001

(65) Prior Publication Data

US 2002/0039189 A1 Apr. 4, 2002

(30) Foreign Application Priority Data

Oct. 3, 2000 (JP) ........................................ 2000-304091

(51) Int. Cl.[7] ................................................ G06K 9/00
(52) U.S. Cl. ........................ 382/169; 358/3.1; 358/3.27
(58) Field of Search ................................ 382/169, 177, 382/199, 200, 209, 256, 258, 266, 270; 358/1.9, 2.1, 2.99, 3.1, 3.27

(56) References Cited

U.S. PATENT DOCUMENTS

| | | | | |
|---|---|---|---|---|
| 5,144,456 A | * | 9/1992 | Sakano | 358/443 |
| 5,422,740 A | * | 6/1995 | Fujimoto et al. | 358/521 |
| 5,589,950 A | * | 12/1996 | Fujimoto et al. | 382/270 |
| 5,754,683 A | * | 5/1998 | Hayashi et al. | 382/167 |
| 5,875,036 A | | 2/1999 | Sasanuma | 358/298 |
| 2003/0133606 A1 | * | 7/2003 | Yano et al. | 382/162 |

FOREIGN PATENT DOCUMENTS

| | | | | |
|---|---|---|---|---|
| EP | 0360402 A2 | * | 3/1990 | G06F/15/68 |
| EP | 0579186 A1 | * | 1/1994 | H04N/1/40 |
| JP | 4-175065 | | 6/1992 | |
| JP | 9-6983 | | 1/1997 | |
| JP | 10-145615 | | 5/1998 | |
| JP | 410337904 | * | 12/1998 | B41J/2/44 |

* cited by examiner

Primary Examiner—Jerome Grant, II
(74) Attorney, Agent, or Firm—Westerman, Hattori, Daniels & Adrian, LLP

(57) ABSTRACT

An image reproducing apparatus, that outputs and reproduces an image having a greater number of gradation levels than that of input image data, is comprised of a buffer memory that accumulates input image data for a plurality of lines; an image data storing unit that extracts and stores image data of region of a predetermined size from the buffer memory; a specified portion detecting unit that detects a specified portion in which gradation of image data varies slowly from the predetermined region of stored image data; and an intermediate density data generating unit that generates, based on a result of detection by the specified portion detecting unit, intermediate density data composed with step smaller than the minimum value of a step between different gradation levels of image data. In the above apparatus, an image having a greater number of gradation levels than that of image data is output based on the intermediate density data. On the other hand, an image reproducing method executed by the above-described image reproducing apparatus or the like, is disclosed.

31 Claims, 19 Drawing Sheets

Fig.14
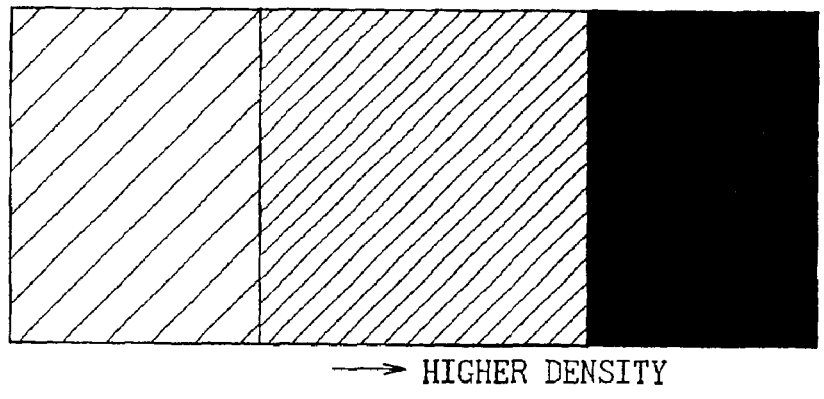
→ HIGHER DENSITY
LEVEL 6 --------------------------------
LEVEL 5 -----------------
LEVEL 4 ------
8 BITS=256 GRADATIONS
↓
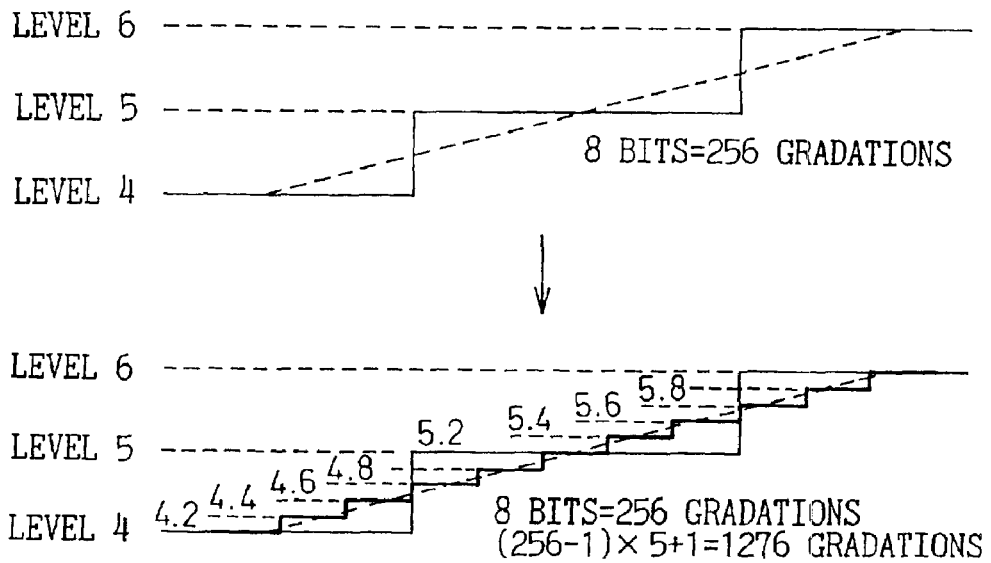
8 BITS=256 GRADATIONS
(256-1)×5+1=1276 GRADATIONS
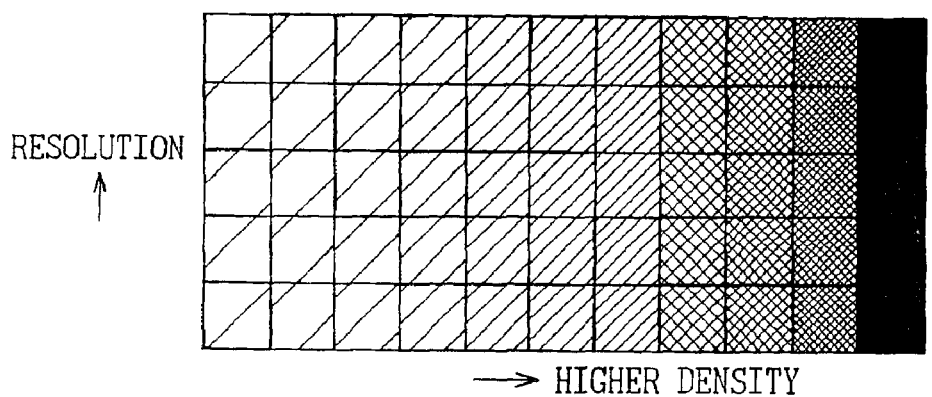
RESOLUTION ↑
→ HIGHER DENSITY

IMAGE REPRODUCING APPARATUS, IMAGE REPRODUCING METHOD, AND COMPUTER READABLE STORAGE MEDIUM

BACKGROUND OF THE INVENTION

1. Field of the Invention

The present invention relates to an image reproducing apparatus, an image reproducing method and a computer readable storage medium for receiving input image data, and outputting and reproducing an image having a greater number of gradation levels than that of the above-mentioned image data.

More particularly, the present invention refers to a technique for improving smoothness of an image that is output, by increasing the number of gradation levels of the above-mentioned image data, when carrying out an output process, such as a printing process of an image using a printer.

2. Description of the Related Art

When a printing process of a full color image is performed using a printer, image data having 256 gradation levels for each of four primary colors of C, M, Y and K are usually used as input data. In other words, image data consisting of 8 bits of gradations for each color (thus, image data of 24 bits in total) are usually input. However, when a printing process is actually performed with 256 gradation levels for each color, the step between different gradation levels may sometimes become visible in a highlighted portion in which luminance of image data is relatively high (that is, portion in which density of image data is low). A possible reason for this is that 256 gradation levels may be inadequate for smooth reproduction of an image since the sensitivity of human eye is relatively high in such a highlight portion.

In order to deal with such a situation, a simple solution is to increase the number of gradation levels of input image data, that is, to use a relatively high number of gradation levels, such as 1024 gradation levels or 4096 gradation levels for each color. It is possible to reproduce a smooth image in which the step between different gradation levels is no longer visible by inputting image data having a relatively large number of gradation levels.

However, the total amount of image data will increase with the increase in the number of gradation levels of the input image data.

Further, the increase of total amount of image data gives rise to another problem that memory capacity needs to be increased in order to store the above-mentioned image data, and the processing time required to process the above-mentioned large amount of image data is also increased.

In addition, with the increasing amount of data it will be also required to expand the means for preparing the relatively large amount of image data and the means for developing the above-mentioned image data, correspondingly, so that the overall size of the apparatus for executing data processing will increase, leading to another problem of an increase in the production cost.

SUMMARY OF THE INVENTION

It is an object of the present invention to solve the above-described problems and to provide an image reproducing apparatus, an image reproducing method and a computer readable storage medium which are capable of reproducing a smoother image than input image data without increasing the data amount of input image data.

To attain the above object, an image reproducing apparatus according to the present invention is comprised of a buffer memory for accumulating input image data for a plurality of lines, an image data storing unit that extracts and stores image data for a predetermined region of given size from the buffer memory, a specified portion detecting unit that detects a specified portion in which the gradation of the above-mentioned image data varies slowly, from the predetermined region of the above-mentioned image data stored in the data storing unit, and a intermediate density data generating unit that generates intermediate density data composed with step smaller than the minimum value of a step between different gradation levels of the above-mentioned image data, in the above-mentioned specified portion. The image reproducing apparatus constructed in this manner is adapted to output and reproduce an image having a greater number of gradation levels than that of the above-mentioned input image data based on the intermediate density data.

Preferably, the image reproducing apparatus of the present invention is further comprised of an image output processing unit that outputs, upon receiving the above-mentioned input image data and the above-mentioned intermediate density data, an image with increased number of gradation levels over the above-mentioned image.

Further, preferably, in the image reproducing apparatus of the present invention, the above-mentioned specified portion is the portion in which image data varies in units of the minimum step of the gradation levels of the image data, and luminance of the above-mentioned image data is higher in the above-mentioned specified portion than in other portion.

Further, preferably, an image reproducing apparatus according to a first embodiment of the present invention is comprised of a buffer memory for accumulating input image data for a plurality of lines, a register that extracts and stores, from the buffer memory, image data of a remarked pixel (i.e. specified pixel) selected from among a plurality of pixels of the input image data, and image data of pixels in the region surrounding the remarked pixel, and an image data operation processing unit that detects a portion containing the above-mentioned remarked pixel in which the gradation of the above-mentioned image data varies slowly by carrying out operation on the gradational variation of the image data in the above-mentioned surrounding region stored in the register, and generates intermediate density data composed with smaller step than the minimum value of the step between the gradation levels of the above-mentioned image data. On the basis of the intermediate density data, an image having a greater number of gradation levels than that of the above-mentioned input image data is output and reproduced.

Further, preferably, an image reproducing apparatus according to a second embodiment of the present invention is comprised of a buffer memory for accumulating input image data for a plurality of lines, a register that extracts and stores, from the buffer memory, image data of a remarked pixel selected from among a plurality of pixels of the input image data, and image data of pixels in region surrounding the remarked pixel, and an image data operation processing unit that calculates an average value of gradations of image data of the above-mentioned remarked pixel and image data of the region surrounding the pixel stored in the register, and a gradational enhancement process on/off deciding unit that detects the maximum and the minimum values of gradation levels in the image data in the region surrounding the remarked pixel, and decides whether or not a gradational enhancement process should be performed on the above-mentioned input image data, depending on whether or not the difference between the maximum and the minimum values is equal to or smaller than a predetermined value.

The above-mentioned image reproducing apparatus according to the second embodiment is constructed such that, if the difference between the above-mentioned maximum and the above-mentioned minimum values is equal to or smaller than the predetermined value, it turns on the above-mentioned gradational enhancement processing on/off deciding unit, and outputs and reproduces an image having a greater number of gradation levels than the input image data, and on the other hand, if the difference between the above-mentioned maximum and the above-mentioned minimum values is larger than the predetermined value, it turns off the above-mentioned gradational enhancement processing on/off deciding unit, and outputs and reproduces an image in which the above-mentioned average value is adopted as a gradation level of the image data of the above-mentioned remarked pixel.

Further, preferably, an image reproducing apparatus according to a third embodiment of the present invention is comprised of a buffer memory for accumulating input image data for a plurality of lines, a register that extracts and stores, from the buffer memory, image data of a remarked pixel selected from among a plurality of pixels of the input image data, and image data of pixels in the surrounding region of the remarked pixel, a template storing unit that stores in advance the correspondence between an arbitrary combination of the above-mentioned plurality of pixels and a gradation having a greater number of gradation levels than that of the above-mentioned input image data, and a coincidence detecting unit that detects whether or not a combination of the plurality of pixels in the templates stored in the template storing unit coincides with the combination of the above-mentioned remarked pixel and pixels in the region surrounding the pixel.

The above-mentioned image reproducing apparatus according to the third embodiment is constructed such that, if the coincidence of the above-mentioned two combinations with each other has been detected, an image having a greater number of gradation levels than that of above-mentioned input image data is output and reproduced based on the corresponding gradation levels in the template.

Further, an image reproducing apparatus according to a fourth embodiment of the present invention is provided, in addition to the components of the above-described first embodiment, with a resolution converting unit that converts a resolution of the above-mentioned input image data to a resolution of higher level, and a position information register that stores position information concerning position of each of the above-mentioned plurality of pixels.

The above-described image reproducing apparatus according to the fourth embodiment is constructed such that, by operating the above-mentioned image data operation processing unit while shifting the position of each of the plurality of pixels stored in the above-mentioned position information register pixel by pixel, an image with higher level of resolution than the above-mentioned input image data and having a greater number of gradation levels than that of the above-mentioned image data is output.

Further, an image reproducing apparatus according to a fifth embodiment of the present invention is provided, in addition to the components of the above-described first embodiment, with an image output on/off deciding unit that decides whether or not an image having a greater number of gradation levels than that of the above-mentioned input image data should be output, depending on whether or not a gradation level of image data in the portion containing the above-mentioned remarked pixel is contained within a predetermined range.

The above-mentioned image reproducing apparatus according to the fifth embodiment is constructed such that, if the gradation level in the portion containing the above-mentioned remarked pixel is contained within the predetermined range, it turns on the image output on/off deciding unit and an image having a greater number of gradation levels than that of the above-mentioned input image data is output, and on the other hand, if the gradation level in the portion containing the above-mentioned remarked pixel is not contained within the predetermined range, it turns off the image output on/off deciding unit and an image having the same number of gradation levels as the above-mentioned input image data is output.

Further, an image reproducing apparatus according to a sixth embodiment of the present invention is provided, in addition to the components of the above-described first embodiment, with a switching instructing means that instructs a switching operation of whether an image having a greater number of gradation levels than that of the above-mentioned input image data is to be output or an image having the same number of gradation levels as the above-mentioned image data is to be output.

On the other hand, an image reproducing method of the present invention comprises the steps of accumulating input image data for a plurality of lines in a buffer memory, extracting and storing image data of a region of a predetermined size from the buffer memory, detecting a specified portion in which the gradation of the above-mentioned image data varies slowly from the predetermined region of the above-mentioned stored image data, generating intermediate density data composed with step smaller than the minimum value of the step between different gradation levels of the above-mentioned image data, and outputting and reproducing an image having a greater number of gradation levels than that of the above-mentioned input image data.

When, on the other hand, a computer readable storage medium is to be used to cause the image reproducing apparatus of the present invention to operate, first means for causing image data of a region of a predetermined size to be extracted and stored from a buffer memory that accumulates input image data for a plurality of lines, second means for causing a specified portion in which gradation of the above-mentioned image data varies slowly to be detected from the predetermined region of the above-mentioned stored image data, third means for causing intermediate density data composed with step smaller than the minimum value of the step between different gradation levels of the above-mentioned image data, and fourth means for causing an image having a greater number of gradation levels than that of the above-mentioned input image data to be output, are provided. The first to the third means can be realized using software including a computer and the like, and the fourth means can be realized using both software and hardware including a computer and the like.

In summary, according to the present invention, intermediate density data having an increased number of gradation levels over input image data are generated in the portion of the image data in which gradation varies slowly, and based on this intermediate density data, an image is output that has a greater number of gradation levels than that of the input image data so that a smoother image than the input image data can be reproduced while suppressing an increase in data amount of the input image data.

BRIEF DESCRIPTION OF THE DRAWINGS

The above object and features of the present invention will be more apparent from the following description of the preferred embodiments with reference to the accompanying drawings, wherein:

FIG. 14 is a view showing an example in which both gradation and resolution are improved in output image data in the embodiment of FIG. 13;

DESCRIPTION OF THE PREFERRED EMBODIMENT

The present invention will now be described with reference to accompanying drawings showing basic embodiments thereof.

Figure 1:
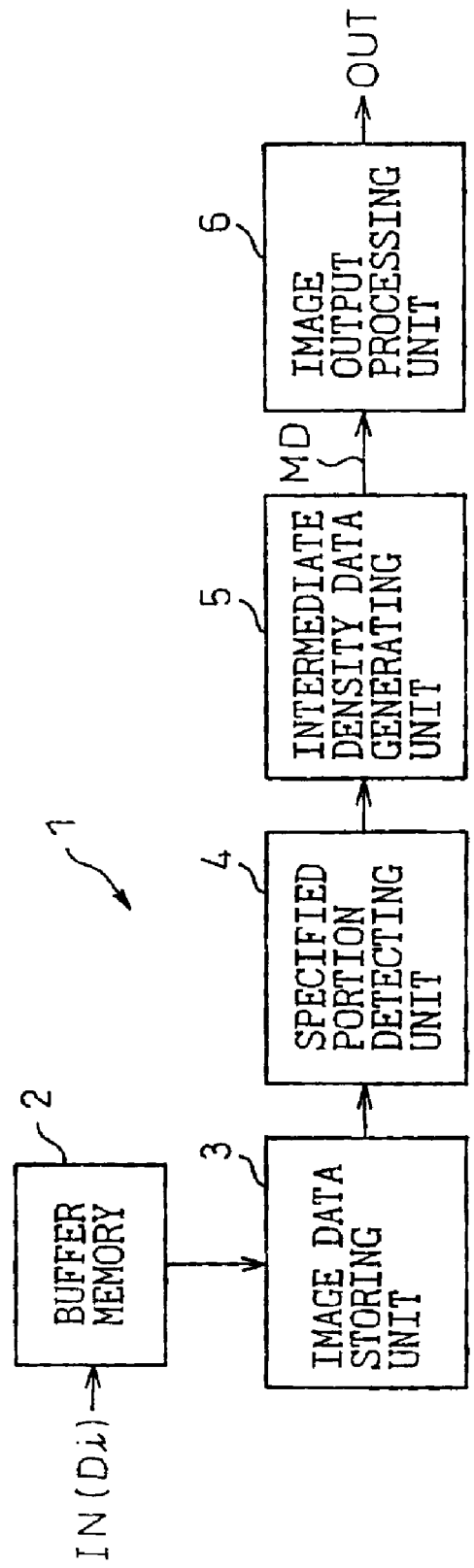
FIG. 1 is a block diagram showing the construction of a basic embodiment based on the principle of the present invention.

FIG. 1 is a block diagram showing the construction of a basic embodiment based on the principle of the present invention.

As shown in FIG. 1, an image reproducing apparatus 1 according to the basic embodiment of the present invention is comprised of a buffer memory 2 for accumulating input image data Di (input data IN) for a plurality of lines, and an image data storing unit 3 that extracts and stores image data of a region of predetermined size from the buffer memory 2. The image data storing unit 3 is preferably composed of a register or the like, as will be described later.

The image reproducing apparatus 1 of FIG. 1 is further comprised of a specified portion detecting unit 4 that detects, from the given region of image data stored in the above-mentioned image data storing unit 3, a specified portion in which gradation of the above-mentioned image data varies slowly, and an intermediate density data generating unit 5 that generates intermediate density data MD composed with step smaller than the minimum value of the step between different gradation levels of above-mentioned image data, based on a result of detection by the specified portion detecting unit 4, in the above-mentioned specified portion. Based on the intermediate density data MD, an image having a greater number of gradation levels than that of the above-mentioned image data Di is output and reproduced as an output image OUT.

Preferably, the image reproducing apparatus of FIG. 1 is provided with an image output processing unit 6 that outputs, on receiving the above-mentioned input image data Di and the above-mentioned intermediate density data MD, an image having a greater number of gradation levels than that of the image data Di.

Further, preferably, in the image reproducing apparatus of the present invention, while gradation varies in units of the minimum value of the step of different gradation levels of the above-mentioned image data in the above-mentioned specified portion, luminance of the image data in the above-mentioned specified portion is higher than in other portions.

On the other hand, an image reproducing method executed by the image reproducing apparatus of FIG. 1 comprises the steps of accumulating input image data for a plurality of lines in a buffer memory, extracting and storing image data of a region of a predetermined size from the buffer memory, detecting a specified portion in which the gradation of the above-mentioned image data varies slowly from the predetermined region of the above-mentioned stored image data, generating intermediate density data composed with smaller step than the minimum step difference of gradation levels of the above-mentioned image data, and outputting and reproducing an image having a greater number of gradation levels than that of above-mentioned input image data.

When, on the other hand, a computer readable storage medium is to be used to cause the image reproducing apparatus of the present invention to operate, first means for causing image data of a region of a predetermined size to be extracted and stored from a buffer memory that accumulates input image data for a plurality of lines, second means for causing a specified portion in which gradation of the above-mentioned image data varies slowly to be detected from the predetermined region of the above-mentioned stored image data, third means for causing intermediate density data composed with step smaller than the minimum value of the step between different gradation levels of the above-mentioned image data, and fourth means for causing an image having a greater number of gradation levels than that of the above-mentioned input image data to be output, are provided. The first to the third means can be realized by using software including a computer and the like, and the fourth means can be realized using both software and hardware including a computer and the like.

In summary, in the above described image reproducing apparatus according to the basic embodiment, intermediate density data having an increased number of gradation levels over input image data are generated in the portion of input image data in which gradation varies slowly, and based on this intermediate density data, an image is output that has a greater number of gradation levels than that of input image data so that a smoother image than the input image data can be reproduced while suppressing an increase in the data amount of the input image data.

Figure 2:
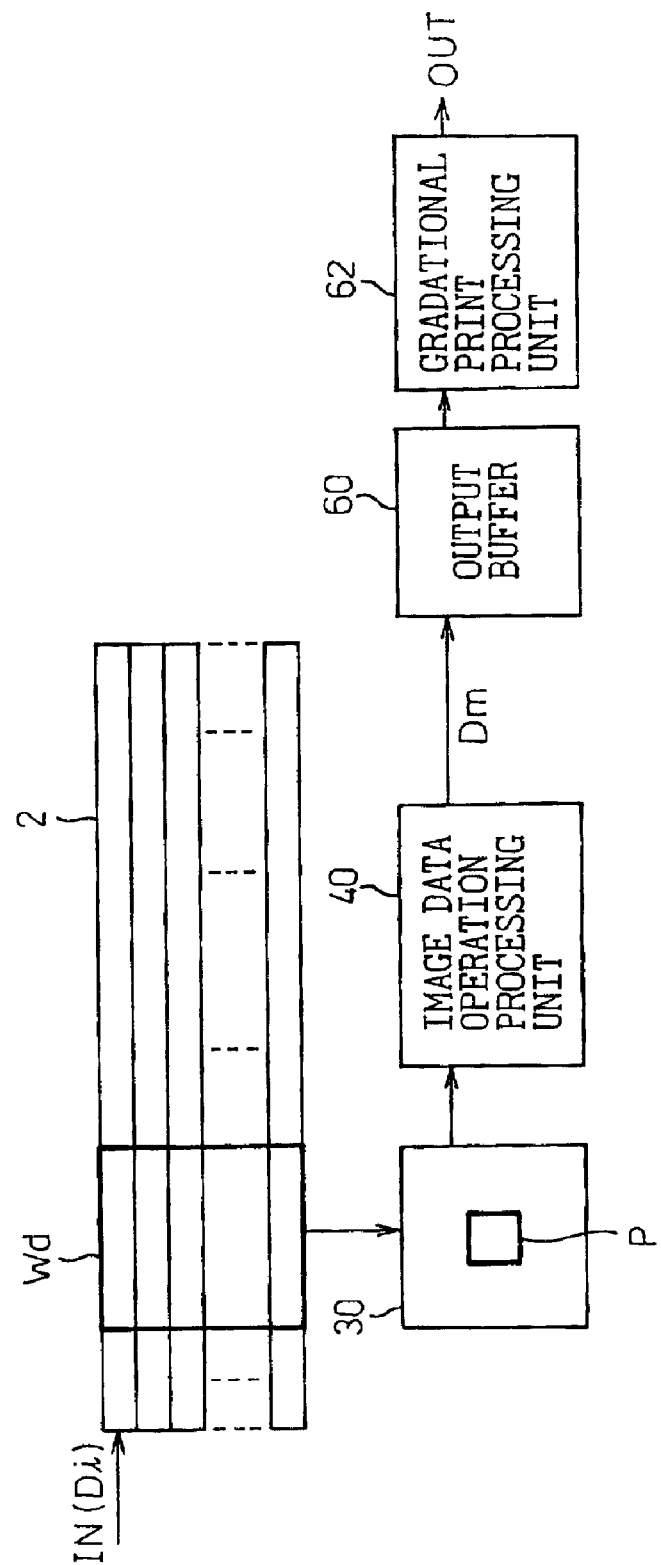
FIG. 2 is a view showing the construction of a first preferred embodiment of the present invention.
Figure 3:
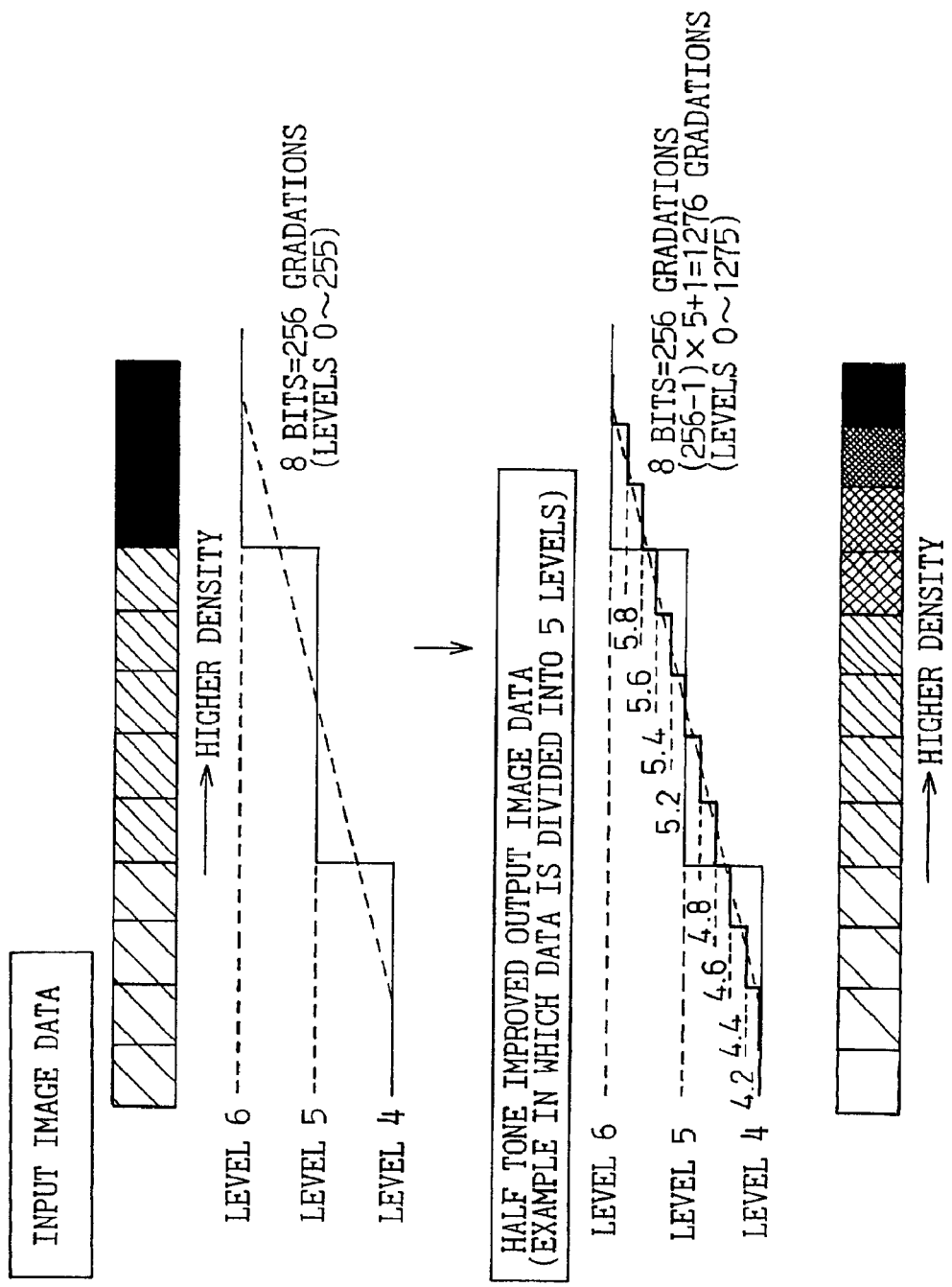
FIG. 3 is a view showing an example in which number of gradation levels of output image data is increased in the embodiment of FIG. 2.

FIG. 2 is a view showing the construction of a first preferred embodiment (hereinafter abbreviated to the "first embodiment") of the present invention, and FIG. 3 is a view showing an example in which the number of gradation levels of output image data is increased in the embodiment of FIG. 2. Here, schematic construction of the image reproducing apparatus of the present invention as applied to a controller of a recording apparatus such as a printer in a printer system (construction of the printer system will be described later with reference to FIG. 8) is shown as a representative example. Hereinafter, the same or like components are denoted by the same reference numerals.

In the controller of a printer that is the main component of a printer system, data sent from a host computer are developed as multilevel (for example, 8 bit) image data. Then, gradational enhancement process such as a variable area toning method is executed on the developed image data to convert the above-mentioned image data into a half tone pattern. Then, based on data of this half tone pattern, an exposure is performed by using a laser beam. After the exposure with the laser beam is performed, development, transfer and fixing are performed using an electrophotographic process, and an image is printed. In FIG. 2 showing the first embodiment, main components of the portion in which the variable area toning method is executed on the image data in the controller are shown.

In the image reproducing apparatus according to the first embodiment of FIG. 2, a buffer memory 2 is provided to accumulate the developed image data Di as input data IN. The buffer memory 2 is preferably composed of a line buffer for storing the image data Di for a plurality of lines. In the image reproducing apparatus of FIG. 2, a register 30 is provided as the above-mentioned image data storing unit 3 of FIG. 1, for extracting and temporarily storing image data of a remarked pixel (shown as the remarked pixel P positioned at the center in FIG. 2) and image data of pixels in the region surrounding the remarked pixel selected from the buffer memory 2. This register 30 is preferably composed of a window register. Here, image data of a region corresponding to a window Wd of a given size are extracted from the image data for a plurality of lines in the buffer memory 2, and written into the window register.

In addition, in the image reproducing apparatus according to the first embodiment of FIG. 2, an image data operation processing unit 40 is provided for calculating the gradational variation of image data of the region surrounding the remarked pixel P stored in the above-mentioned window register. The image data operation processing unit 40 corresponds to the above-described specified portion detecting unit 4 and intermediate density data generating unit 5 of FIG. 1, and is preferably composed of a LSI circuit (Large Scale Integrated circuit) in the controller (to be described later with reference to FIG. 8). Further, the above-mentioned image data operation processing unit 40 detects a portion containing the remarked pixel P in which gradation of the image data varies slowly as a specified portion. The specified portion detected in this manner may include the portion in which gradation varies in units of the minimum value of the step between different gradation levels of the image data.

Then, the above-mentioned image data operation processing unit 40 generates intermediate density data MD (see FIG. 1) that is composed with steps smaller than the minimum value of the step between different gradation levels of the image data depending on the rate of variation of gradation in the portion containing the remarked pixel P. The intermediate density data MD have a greater number of gradation levels than that of input image data Di, and are also referred to as half tone improved output image data Dm.

More specifically, as shown in FIG. 3, based on gradation levels (upper half part of FIG. 3) of the specified portion (that is, portion containing the remarked pixel P) extracted from the input image data Di, new gradation (lower half part of FIG. 3) is generated by further dividing the step between above-mentioned gradation levels. The new gradation generated in this manner contains a greater number of gradation levels than that of input image data Di.

Suppose, for example, that in the specified portion of the input image data Di, gradation levels for each pixel are from left to right $$- - - 4, 4, 4, 4, 4, 5, 5, 5, 5, 5, 6, 6, 6, 6, 6, - - - \qquad (1)$$

Here, the larger the number indicating gradation level, the higher is gradation level (that is, half tone density). In FIG. 3, the change of gradation level is expressed by varying the line separation of hatching or the like. Thus, smaller separation between lines of hatching indicates higher gradation level and higher density.

In the first embodiment of the present invention, the above gradation levels (1) are converted as shown in lower half part of FIG. 3, to $$- - - 4.0, 4.2, 4.4, 4.6, 4.8, 5.0, 5.2, 5.4, 5.6, 5.8, 6.0, 6.2, 6.4, 6.6, 6.8 - - - \qquad (2)$$

Thus, if input image data have 256 gradation levels, this will be converted to (256−1)×5+1=1276 gradation levels by dividing each step into five.

In this manner, the step between gradation levels of image data in a window region Wd of a given size can be converted to a value smaller than the minimum value of the step between different gradation levels in prior art. If an operational process of image data is performed in real time while shifting the window from left to right, the step of gradation levels of image data in all other regions can be equally converted to a value smaller than the minimum value of the step between different gradation levels in the prior art. In other words, the first embodiment of the present invention permits half tone improved output image data Dm to be generated so as to connect the value of input data by gradational enhancement process that increases the number of gradation levels of image data.

The image reproducing apparatus of FIG. 2 is further provided with an output buffer 60 on the output side of the image data operation processing unit 40. The output buffer 60 has the function of temporarily storing the half tone improved output image data Dm generated for image data of all the regions in order to synchronize the input image data Di and the output image OUT. In addition, a gradational print processing unit 62 is provided corresponding to the above-described image output processing unit 6 of FIG. 1. The gradational print processing unit 62 has the function of performing a printing process to reproduce an image having an increased number of gradation levels over the above-mentioned input image data Di.

Although the amount of operation to be processed is large in the image reproducing method according to the first embodiment as shown in FIG. 2, it is possible to speed up the operation by parallel processing of the operation. When data having a relatively large number of gradation levels are to be generated in practice, intermediate gradation levels between gradation levels of the input image data are output by the process of interpolation of values from one pixel to other.

Then, smooth gradation can be realized by executing a gradational enhancement process (including a variable area toning method) that exceeds 256 gradation levels (for example, by converting to 1276 gradation levels) and outputting. As a result of such a gradational enhancement process, the step between different gradation levels becomes relatively small and cannot be easily recognized in an image in which, before this process, the step between different gradation levels was visible. Thus, a smoother image can be reproduced. In particular, in the highlight portion in which luminance of image data is relatively high and the step between different gradation levels tends to be clearly visible, the effect of the gradational improvement of output image is evidently high.

Preferably, an image reproducing program including the gradational enhancement process executed by the first embodiment of FIG. 2 is stored in a controller of a printer system or a host computer (see FIG. 8 to be described later). More specifically, the above-mentioned program for image reproduction comprises the steps of accumulating input image data for a plurality of lines in a buffer memory, extracting and storing image data of a region of a predetermined size from the buffer memory, detecting a specified portion in which the gradation of the above-mentioned image data varies slowly from the predetermined region of the above-mentioned stored image data, generating intermediate density data composed with step smaller than the minimum value of the step between different gradation levels of the above-mentioned image data, and outputting and reproducing an image having a greater number of gradation levels than that of the above-mentioned input image data.

When, in the first embodiment of FIG. 1, a computer readable storage medium is used to operate a printer system, a storage medium such as a hard disk that stores the content of the above-mentioned image reproducing program (see FIG. 8 to be described later) is preferably provided.

Figure 4:
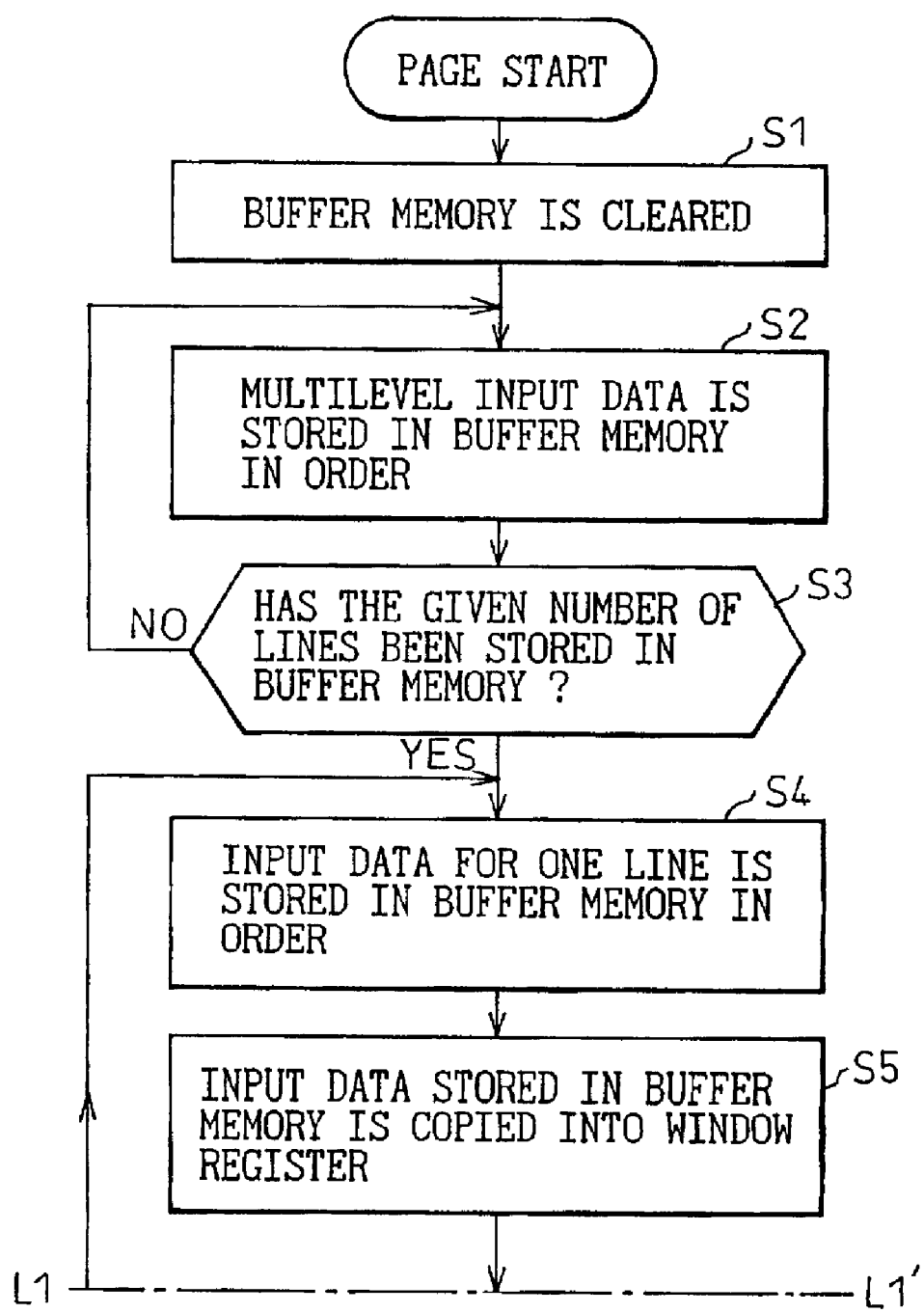
FIG. 4 is a flow chart (1) useful for explaining the operation of the embodiment of FIG. 2.
Figure 5:
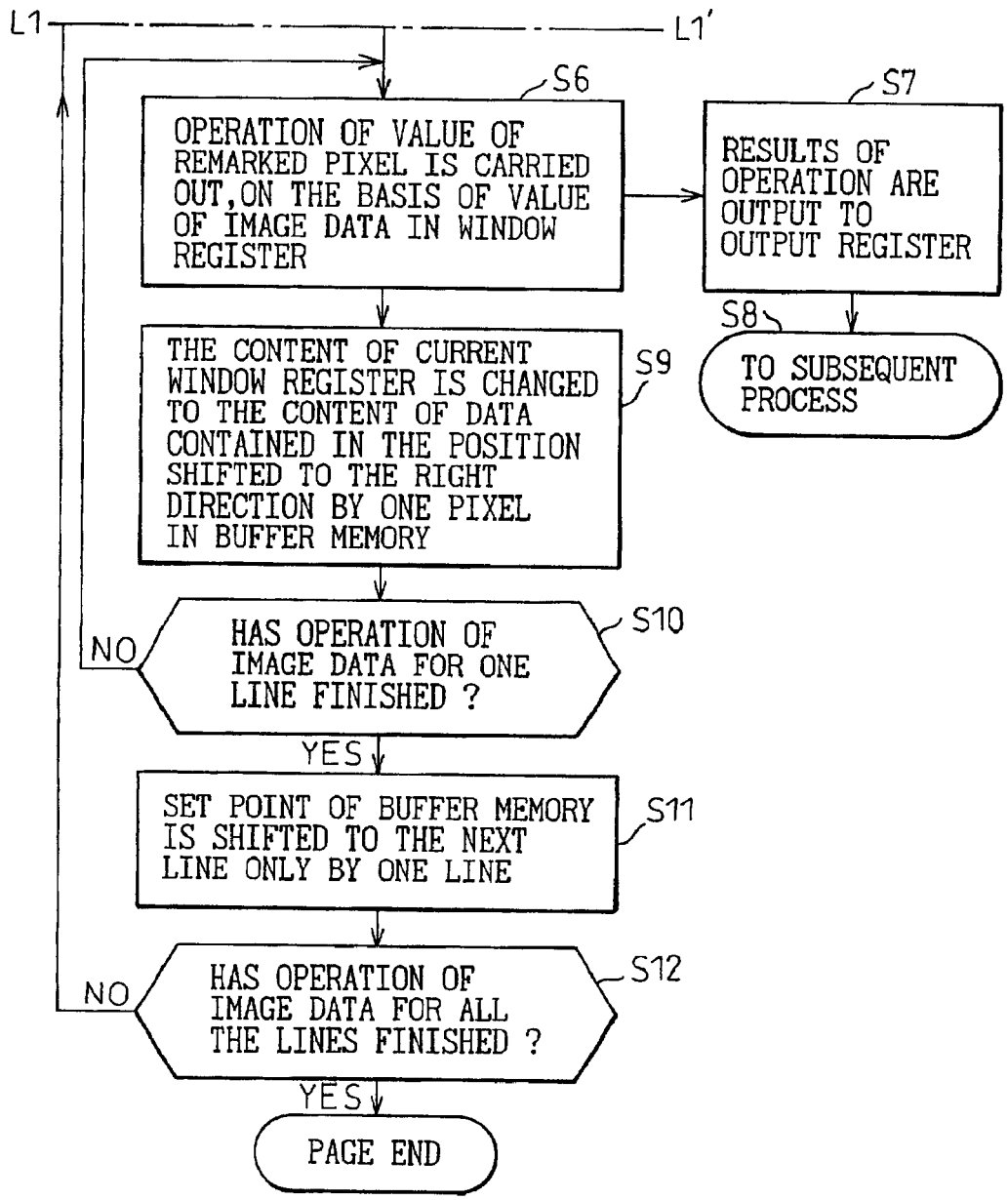
FIG. 5 is a flow chart (2) useful for explaining the operation of the embodiment of FIG. 2.
Figure 6:
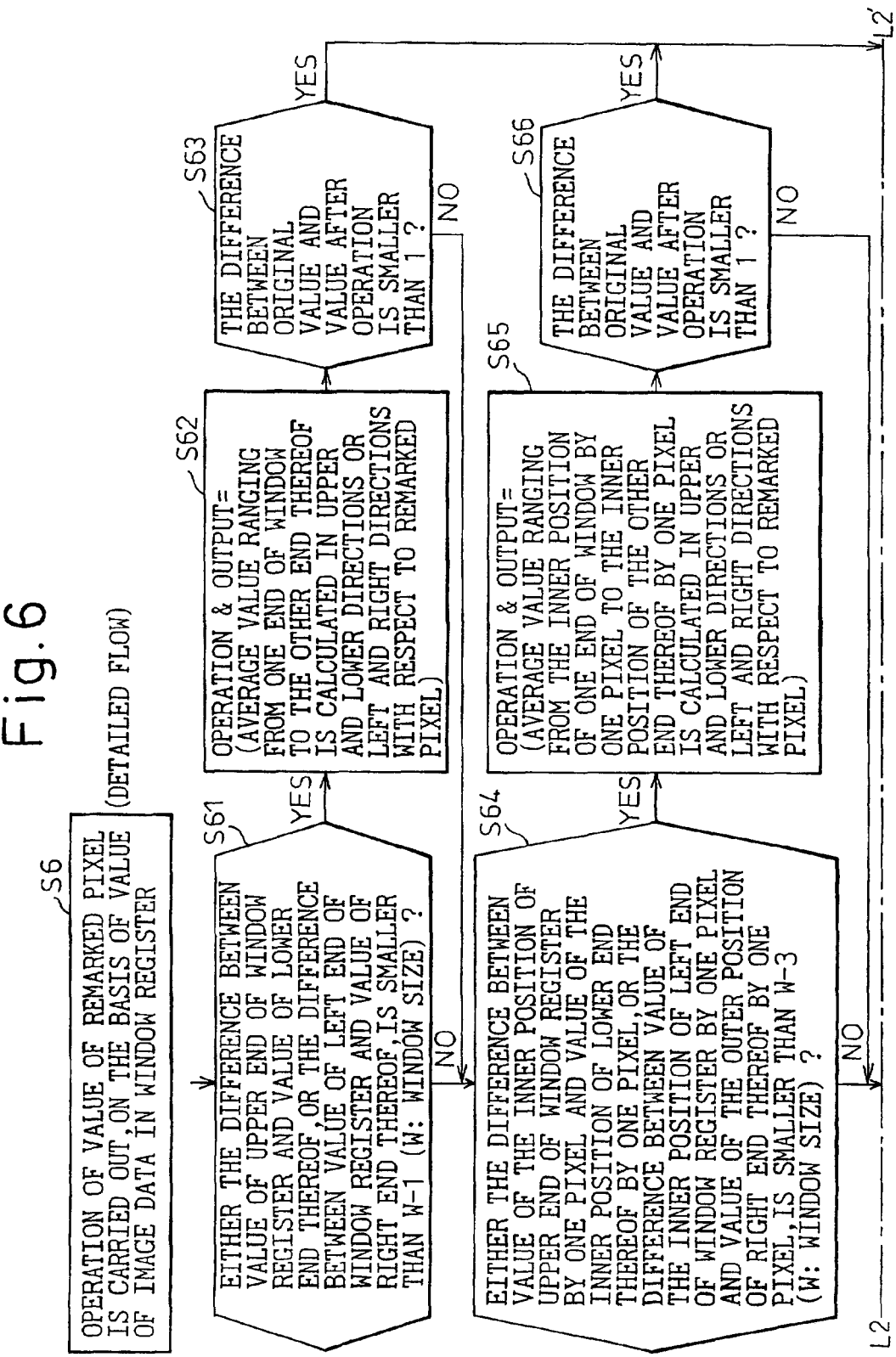
FIG. 6 is a flow chart (1) useful for explaining in greater detail a part of the flow chart of FIG. 5.
Figure 7:
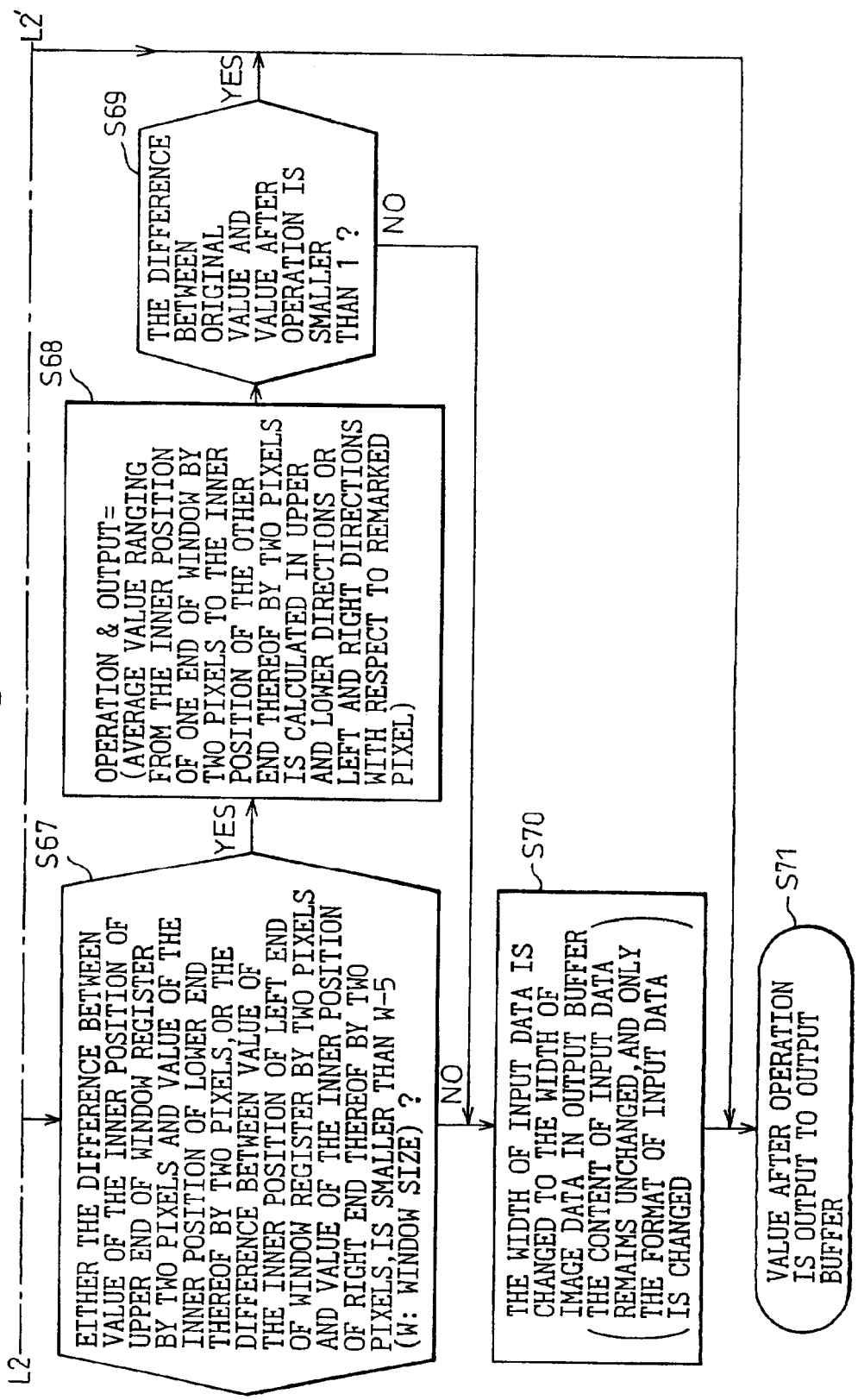
FIG. 7 is a flow chart (2) useful for explaining in greater detail a part of the flow chart of FIG. 5.

FIGS. 4 and 5 are flow charts (1) and (2), respectively, useful for explaining the operation of the embodiment shown in FIG. 2. FIGS. 6 and 7 are flow charts (1) and (2), respectively, useful for explaining a part of the flow chart of FIG. 5 in more detail. Here, specific flow of a process executed by the image reproducing program including the above-mentioned gradational enhancement process is explained in detail.

As shown in the flow chart of FIG. 4, in order to execute the gradational enhancement process on image data input in unit of page, first, the controller or the host computer clears the content of the buffer memory (step S1).

Next, the multilevel (for example, 8 bit) input data transferred from the host computer are stored in the buffer memory in order (step S2). The storing operation for storing the input data in the buffer memory is accomplished until a given number of lines are accumulated in the buffer memory (step S3).

Then, input data for the next line following the given number of lines are stored in the buffer memory in order, to complete one window (step S4). Image data in the window stored in the buffer memory are then extracted and copied into a predetermined window register (step S5).

Then, as shown in the flow chart of FIG. 5, the operation of the value of a remarked pixel is carried out on the basis of values of image data of pixels in the region surrounding the remarked pixel in the window register (step S6). As a result of the operational process (that is, gradational enhancement process), half tone improved output image data having a greater number of gradation levels than that of input data are output to an output buffer (step S7). Based on this half tone improved output image data, a printing process of an image having an increased number of gradation levels over that of input data is carried out (subsequent process at step S8).

Then, the content of current window register is changed to the content of data contained in the position shifted to the right by one pixel in the buffer memory, and it is determined whether or not the last position in one line has been reached (step S9). If the last position in one line has been reached (step S10), set point of the buffer memory is shifted to the next line only by one line (step S11). When the operation of image data in the above-mentioned steps S4 to S11 has been carried out for all the lines stored in the window register (step S12), the operation of image data in the page has been completed.

Next, a more detailed flow of the process at step S6 of FIG. 5, that shows the gradational enhancement process which is the main feature of the present invention, will be explained with reference to FIGS. 6 and 7.

As shown in the flow chart of FIG. 6, when the operation of value of image data of the remarked pixel is carried out on the basis of value of image data in the window register, it is first determined whether or not either the difference between value of upper end of window register and value of lower end thereof, or the difference between value of left end of window register and value of right end thereof, is smaller than (W−1) (W: window size) (step S61).

If either the difference between the value of the upper end of window register and the value of the lower end thereof, or the difference between the value of the left end of window register and the value of the right end thereof, is smaller than (W−1), judging that a region in which gradation varies slowly has been detected, a gradational enhancement process is carried out by the operation of value (for example, value of gradation) of pixels in the region surrounding the remarked pixel, calculating average value ranging from one end of window to the other end thereof in upper and lower directions or left and right directions with respect to the remarked pixel (step S62).

In order to avoid an anomalous value which may result from calculation when odd image data enter into the window register, it is checked whether or not the difference between the original value and the value after operation is smaller than 1 (step S63).

If, as a result of this check, it is determined that the difference between the original value and the value after operation is equal to or larger than 1, judging that odd image data have entered into the window register, the process moves to the next step S64 without changing the content of image data in the window register.

If it is determined that the difference between the original value and the value after operation is smaller than 1, judging that the gradational enhancement process has been carried out normally, the value after operation is output as it is to the output buffer (step S71 of FIG. 7).

At the above-mentioned step S64, if either the difference between value of upper end of window register and value of lower end thereof, or the difference between value of left end of window register and value of right end thereof, is equal to or larger than (W−1), it is determined whether or not either the difference between value of the inner position of upper end of the window register by one pixel and value of the inner position of lower end thereof by one pixel, or the difference between value of the inner position of left end of the window register by one pixel and value of the inner position of right end thereof by one pixel, is smaller than (W−3). Thus, at this step, a detection of a region in which gradation varies slowly is attempted in more restricted range by reducing the width of the window.

If either the difference between value of upper end of window register and value of lower end thereof, or the difference between value of left end of window register and value of right end thereof, is smaller than (W−3), judging that a region in which gradation varies slowly has been detected, a gradational enhancement process is carried out by operation of value of pixels in the region surrounding the remarked pixel, calculating average value ranging from the inner position of one end of window by one pixel to the inner position of the other end thereof by one pixel in upper and lower directions or left and right directions with respect to the remarked pixel (step S65).

Again, in order to avoid an anomalous value which may result from calculation when odd image data enter into the window register, it is checked whether or not the difference between the original value and the value after operation is smaller than 1 (step S66).

If, as a result of this check, it is determined that the difference between the original value and the value after operation is equal to or larger than 1, judging that odd image data have entered into the window register, the process moves to the next step S67 without changing the content of image data in the window register.

If it is determined that the difference between the original value and the value after operation at step S65 is smaller than 1, judging that the gradational enhancement process has been carried out normally, the value after the operation is output as it is to the output buffer (step S71 of FIG. 7).

At the above-mentioned step S67 of FIG. 7, if either the difference between value of upper end of window register and value of lower end thereof, or the difference between value of left end of window register and value of right end thereof, is equal to or larger than (W−3), it is determined whether or not either the difference between value of the inner position of upper end of the window register by two pixels and value of the inner position of lower end thereof by two pixels, or the difference between value of the inner position of left end of the window register by two pixels and value of the inner position of right end thereof by two pixels is smaller than (W−5).

If either the difference between value of upper end of window register and value of lower end thereof, or the difference between value of left end of window register and value of right end thereof, is smaller than (W−5), judging that a region in which gradation varies slowly has been detected, a gradational enhancement process is carried out by the operation of value of pixels in the region surrounding the remarked pixel, calculating average value ranging from the inner position of one end of window by two pixels to the inner position of the other end thereof by two pixels in upper and lower directions or left and right directions with respect to the remarked pixel (step S68).

Again, in order to avoid an anomalous value which may result from calculation when odd image data enter into the window register, it is checked whether or not the difference between the original value and the value after operation is smaller than 1 (step S69).

If it is determined that the difference between the original value and the value after operation at step S68 is smaller than 1, judging that the gradational enhancement process has been carried out normally, the value after operation is output as it is to the output buffer (step S71).

If either the difference between value of upper end of window register and value of lower end thereof, or the difference between value of left end of window register and value of right end thereof, is equal to or larger than (W−5), the width of input data is changed to the width of image data in the output buffer, content of input data remaining unchanged (step S70). This is because only the format of data needs to be changed so as to expand the width for all the data input to the output buffer so that the same output buffer can receive both data that have been and have not been subjected to the gradation enhancement process.

In the above-described flow charts of FIGS. 6 and 7, an example is shown in which the gradation enhancement process is carried out by setting three stages of window size. However, the present invention is not limited to this window size, but any number of stages may be set for the window size.

Figure 8:
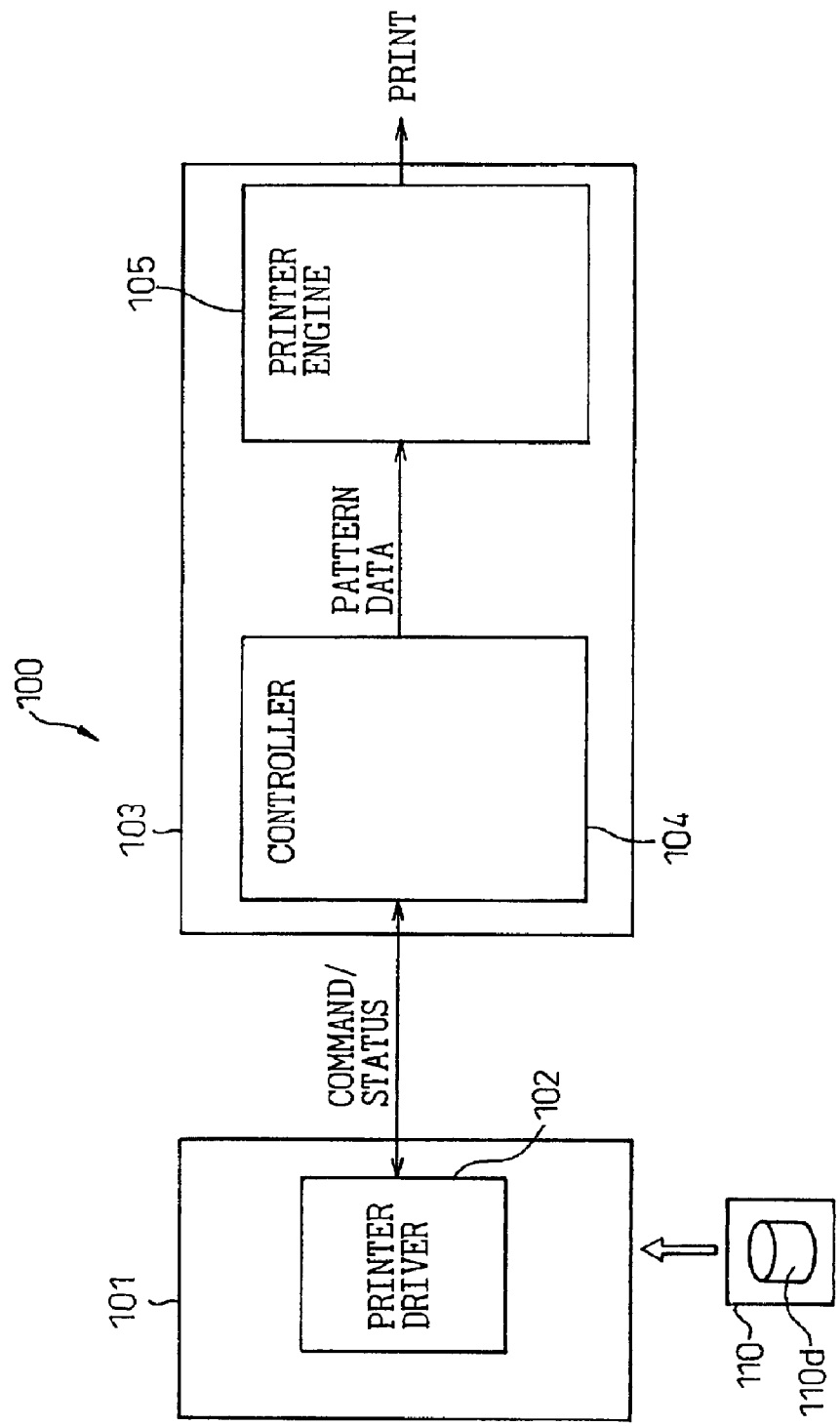
FIG. 8 is a block diagram showing schematic construction of a printer system to which the image reproducing apparatus of the present invention is applied.

FIG. 8 is a block diagram showing schematic construction of a printer system to which the image reproducing apparatus of the present invention is applied. Here, a commonly used printer apparatus such as a laser printer is adopted as the printer apparatus constituting main part of the printer system.

The printer system 100 as shown in FIG. 8 is comprised of a printer apparatus 103 that prints and reproduces an image including intermediate density data after the gradational enhancement process, and a host computer 101 that supplies image data and command signal to the printer 103, and receives status signal indicating current status of the printer.

More specifically, the printer apparatus 103 is comprised of a controller 104 that performs gradational enhancement process on input image data and causes an output process such as a print process to be executed, and a printer engine 105 for printing an image in response to the controlling signal from the controller 104. The controller 104 has additional function of carrying out gradation enhancement process that is the main feature of the present invention. On the other hand, the printer engine 105 has the function of reproducing an image by printing the image after gradational enhancement process in the region corresponding to the respective positions of a plurality of pixels, based on pattern data such as intermediate density data from the controller 104.

On the other hand, the host computer 101 is comprised of a printer driver 102 for supplying the controller 102 with image data and command signal to operate the printer engine 105. The host computer 101 is further provided with a storage medium driver 110 for driving a storage medium 110d such as a hard disk. The image reproducing program including the gradation enhancement process to be performed on image data is stored in the controller 104 in the printer apparatus 103 or in the storage medium 110d in the storage medium driver 110 provided in the host computer.

In the controller 104 of FIG. 8, data transferred from the host computer 102 are developed into multi-level image data. Then, the gradation enhancement process is performed on the developed image data to convert above-mentioned image data into half tone pattern. Then, based on the pattern data (for example, intermediate density data) consisting of the half tone pattern, the printer engine 105 performs exposure with laser light. After an exposure with laser light, development, transfer and fixing are performed according to the electro-photographic process, and finally an image that is smoother than the input data is printed out.

Figure 9:
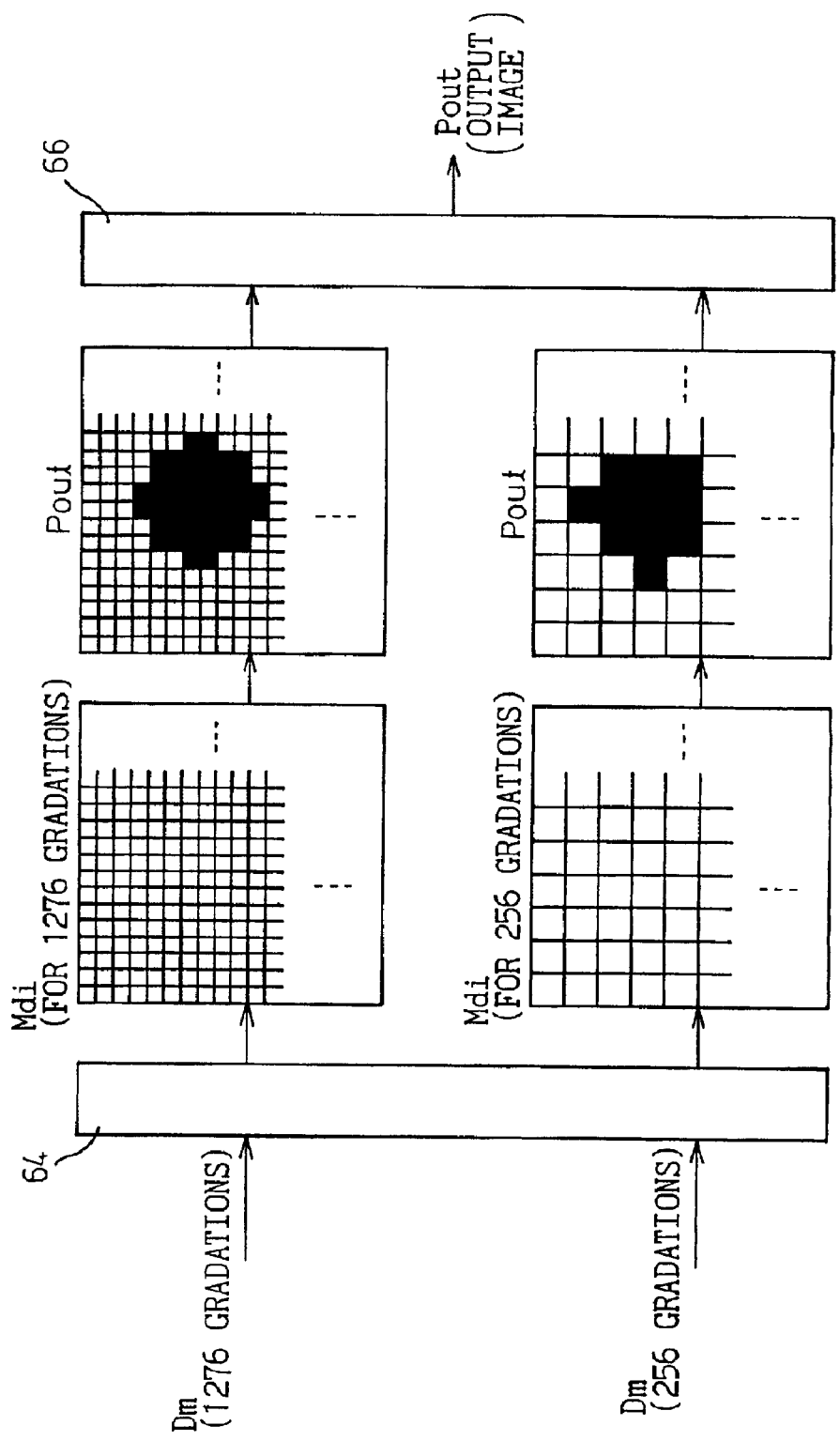
FIG. 9 is a block diagram showing detailed construction of the gradational print processing unit of FIG. 2.

FIG. 9 is a block diagram showing detailed construction of the gradational print processing unit of FIG. 2. The gradational print processing unit 2 (FIG. 2) forms a part of the printer engine in the printer apparatus.

The gradational print processing unit is comprised of a dither switching circuit 64 for switching to select which dithering process is to be executed on the halftone improved output image data Dm (that is, intermediate density data), and a pattern switching circuit 66 for determining which dither matrix Mdi is to be used to generate output pattern Pout having corresponding gradation levels. In accordance with respective dithering process, a different dither matrix is used and a different output pattern is output. As with input data, an image is output after switching to the output pattern used. Here, the output pattern having a greater number of gradation levels (in this case, output pattern having 1276 gradation levels) permits smoother gradation to be reproduced and smaller step between different gradation levels to be realized.

More specifically, the gradational print processing unit of FIG. 9 comprise a dither matrix for 256 gradations and a dither matrix for 1276 gradations, as the dither matrix Mdi to be used as threshold matrix for dithering process of half tone improved output image data Dm. Depending on the gradation levels (256 gradations or 1276 gradations) of the half tone improved output image data Dm, the dither switching circuit 64 is operated to select one of the above-mentioned two dither matrices. Then, output pattern Pout is generated based on the selected dither matrix, and is output from the pattern switching circuit 66, thereby enabling an image having multiple gradations, with at most 1276 gradation levels, to be reproduced.

On the other hand, as another dithering process method the gradational print processing unit may provide a dither matrix that can express a higher gradation levels than 1276 gradations, and a dithering process may be performed by conversion to necessary matrix value of 256 gradations or 1276 gradations.

As a result of the above-mentioned dithering process, a step between different gradation levels becomes relatively small in an image in which the step between different gradation levels was visible, so that a smoother image can be reproduced. In particular, in a highlight portion in which luminance of image data is relatively high and the step between gradations tends to be visible, gradational improvement of output pattern is highly effective.

Further, in the above-mentioned first embodiment, after a gradational enhancement process has been performed on image data, the image data may be stored in an output buffer such as a line buffer. If a control pattern of laser light exposure is extracted directly from this output buffer to execute on/off control of laser light in proper timing, the need for an output buffer having large memory capacity can be eliminated. It is not required to increase data amount of input image data, since intermediate density data having an increased number of gradation levels may be generated and stored in an output buffer with small memory capacity, for the same amount of input image data.

As a result, an increase of the circuit size required to realize the image reproducing apparatus of the present invention is kept to a minimum. Factors that tend to increase cost are few, and the overall cost of the apparatus can be made quite low. On the other hand, since an increase of handling data does not arise except inside the circuit, a lowering of performance due to an increase in data amount can be avoided.

Figure 10:
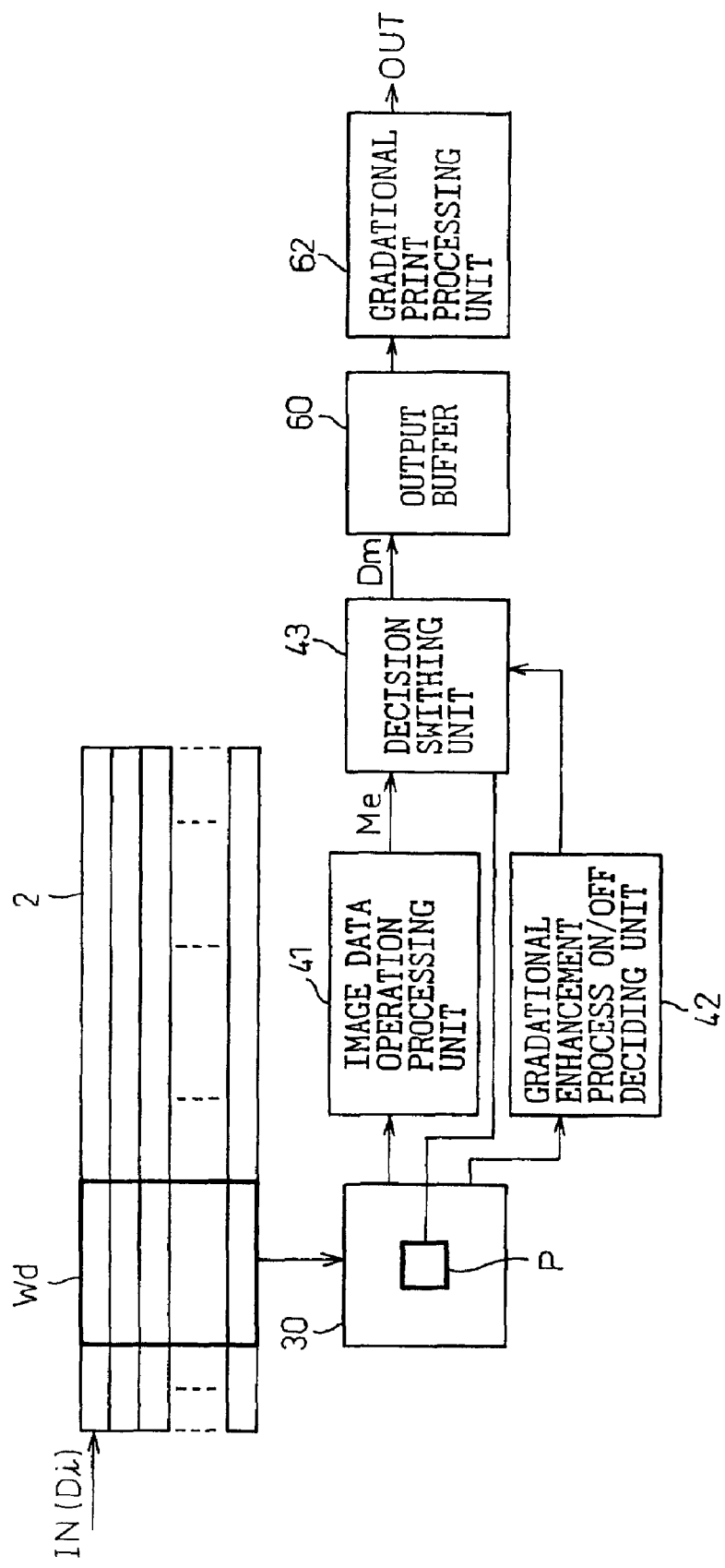
FIG. 10 is a block diagram showing the construction of a second preferred embodiment of the present invention.

FIG. 10 is a block diagram showing the construction of a second preferred embodiment (hereinafter abbreviated to the "second embodiment") of the present invention. Again, schematic construction of the image reproducing apparatus of the present invention as applied to a controller in a printer system is shown here as a representative example.

In the second embodiment, as shown in FIG. 10, in place of the image data operation processing unit 40 in the above-described first embodiment of FIG. 2, an image data operation processing unit 41 that calculates an average value Me of gradation of image data in a predetermined region, a gradational enhancement process on/off deciding unit 42 that decides whether or not gradational enhancement process of image data is to be executed, and a decision switching unit 43 that selects whether half tone improved output data Dm is to be generated or not depending upon the decision of the gradational enhancement process on/off deciding unit 42, are provided. Components other than the image data operation processing unit 41, the gradational enhancement process on/off deciding unit 42, and the decision switching unit 43, are same as in the above-described first embodiment, so that explanation of these components is not repeated here.

In the second embodiment of FIG. 10, an average value Me of gradation is calculated in the image data operation processing unit 41 from image data of the remarked pixel P and image data in the region surrounding the remarked pixel P stored in the register 30. More specifically, after the total sum of the value of gradation of the remarked pixel P and the value of gradation of pixels in the region surrounding the remarked pixel P is calculated, an average value of gradation per pixel is calculated and adopted as the value of gradation of the remarked pixel P.

However, this will necessarily lead to lowering of resolution of the image data. In order to avoid the lowering of resolution, a gradational enhancement process on/off deciding unit 42 is provided to decide whether gradation varies slowly in the region or not, and thereby to control whether or not a gradational enhancement process is to be performed. More specifically, in the gradational enhancement process on/off deciding unit 42, the maximum value and the minimum value of gradation levels in the region surrounding the remarked pixel P in the register 30 are detected, and whether gradational enhancement process for increasing the number of gradation levels of input data IN is to be performed or not is decided according whether the difference between the maximum value and the minimum value is equal to or less than a predetermined value.

If the above-mentioned difference between the maximum value and the minimum value is equal to or less than the predetermined value, judging that a region in which gradation varies slowly has been detected, the gradation enhancement process on/off deciding unit 42 is turned on to operate the decision switching unit 43 and generate half tone improved output image data Dm having a greater number of gradation levels than that of input data IN. Based on the half tone improved output image data Dm, print processing of an image having an increased number of gradation levels over input data IN is carried out.

On the other hand, if the above-mentioned difference between the maximum value and the minimum value is greater than the predetermined value, judging that a region in which gradation varies relatively fast has been detected, the gradation enhancement process on/off deciding unit 42 is turned off and the decision switching unit 43 is made non-operational so that an image adopting the above-mentioned average value as the value of gradation of the remarked pixel P is printed and reproduced.

Above-described second embodiment is advantageous in that the averaging process itself for calculating an average value of gradation inside the window can be executed with the construction by using relatively simple circuits.

When the difference between the maximum value and the minimum value is relatively large, that is, when gradation does not vary slowly inside the window, side effects such as a lowering of resolution of image data hardly arise so that there is no problem in adopting the above-mentioned average value as the value of gradation of the remarked pixel P.

It is possible to modify the averaging process by increasing weight of the remarked pixel P compared to other pixels in region surrounding the remarked pixel P. It is also possible to vary the smoothness of gradation by varying the size of pixels in surrounding region involved in the operation.

Figure 11:
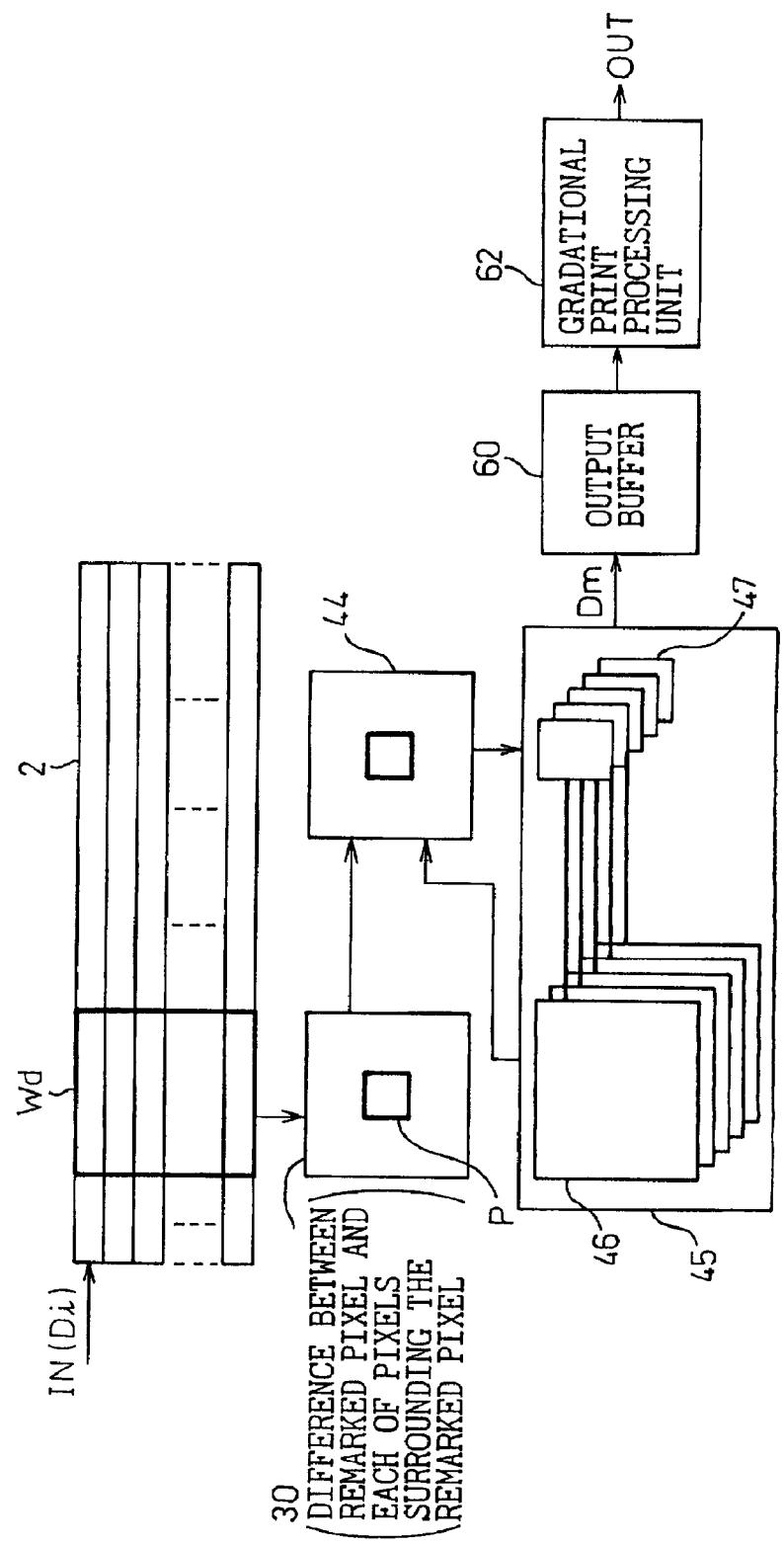
FIG. 11 is a block diagram showing the construction of a third preferred embodiment of the present invention.

FIG. 11 is a block diagram showing the construction of a third preferred embodiment (hereinafter abbreviated to the "third embodiment") of the present invention. Again, schematic construction of the image reproducing apparatus of the present invention as applied to a controller in a printer system is shown here as a representative example.

In the third embodiment as shown in FIG. 11, in place of the image data operation processing unit 40 in the above-described first embodiment of FIG. 2, a template storing unit 46 that stores in advance the correspondence between arbitrary combination of a plurality of pixels of input image data and gradation having a greater number of gradation levels than that of the above-mentioned image data as templates, and a coincidence detecting unit 44 that detects whether or not a combination of a plurality of pixels in a template stored in the template storing unit 46 coincides with the combination of the remarked pixel P and the pixels in the region surrounding the above-mentioned remarked pixel P. Components other than the template storing unit 46 and the coincidence detecting unit 44 are the same as in the above-described first embodiment, so that an explanation of these components is not repeated here.

In the third embodiment of FIG. 11, while arbitrary combinations of the remarked pixel P and pixels in surrounding region are stored in advance as template group 45 in the template storing unit 46, values of gradation having a greater number of gradation levels than that of input data and corresponding to above-mentioned combinations are stored in advance as corresponding gradation level group 47 in the above-mentioned template storing unit 46. In the coincidence detecting unit 44, it is determined whether or not a combination of a plurality of pixels in the template group 47 coincides with the combination of the remarked pixel P and pixels in region surrounding the remarked pixel P stored in the register.

If it is confirmed that the above two combinations coincide with each other, a value of gradation is changed to the value of corresponding gradation in the template group, and based on the changed value of gradation, an image having a greater number of gradation levels is printed and reproduced.

Since, in the above-described third embodiment, matching by template is used for detecting the variation of gradation in the region extracted by the register 30, content of operation to be processed can be reduced compared to direct operation of the gradation value of pixels. Thus, operation process of the value of gradation can be executed relatively fast, leading to reduction of time required for gradational enhancement process.

Figure 12:
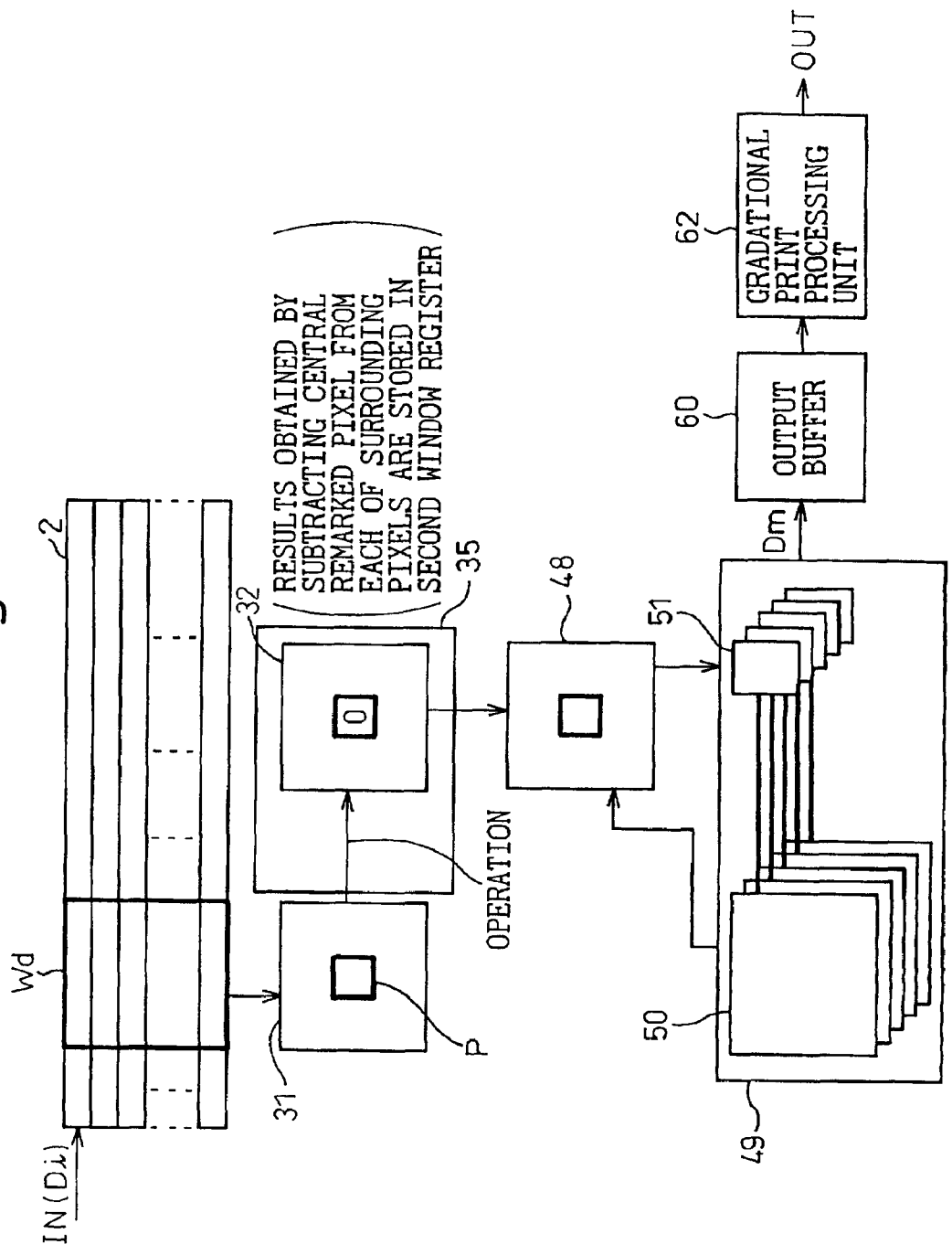
FIG. 12 is a block diagram showing the construction of a modification of the embodiment of FIG. 11.

FIG. 12 is a block diagram showing the construction of a modification of the embodiment of FIG. 11. Again, schematic construction of the image reproducing apparatus of the present invention as applied to a controller in a printer system is shown here as a representative example.

In the modification as shown in FIG. 12, in place of the register 30 in the above-described third embodiment of FIG. 11, a first window register (corresponding to the first register as described in "SUMMARY OF THE INVENTION") 31, a remarked pixel operation processing unit 35, and a second window register 32 (corresponding to the second register as described in "SUMMARY OF THE INVENTION") are provided. The first window register 31 has the function of extracting and storing image data of the remarked pixel P and image data of pixels in region surrounding the above-mentioned remarked pixel P, from image data in the buffer memory 2. On the other hand, the remarked pixel operation processing unit 35 has the function of setting the value of gradation of the remarked pixel P as a reference value, and subtracting the value of gradation of the remarked pixel P from the value of gradation of pixels in region surrounding the above-mentioned remarked pixel P. The second window register 32 has the function of storing the result of this subtraction as difference data. Even if the gradation of the remarked pixel P has a value in the second window register 32, the value of gradation of the remarked pixel P is set to be zero (0) as a representative value.

In the modification as shown in FIG. 12, in place of the template storing unit 46 and the coincidence detecting unit 44 in the above-described third embodiment of FIG. 11, a difference template storing unit 49 that stores in advance the correspondence between difference data of an arbitrary pixel in region surrounding the remarked pixel P and gradation having a greater number of levels than that of input image data as templates, and a difference coincidence detecting unit 48 that detects whether or not a difference data stored in the difference template storing unit 49 coincides with the difference data stored in the second window register 32, are provided.

Components other than the first and the second window registers 31 and 32, the difference template storing unit 49, and the difference coincidence detecting unit 48, are same as in the above-described third embodiment, and therefore, an explanation of these components is not repeated here.

In the modification of FIG. 12, if gradation of the remarked pixel P has a value, this value of gradation is subtracted from all the pixels in the first window register 31. As a result, the value of gradation of the remarked pixel P becomes 0. Similarly, the values of gradation of pixels in region surrounding the remarked pixel P are converted to difference data from the remarked pixel. On the other hand, while difference data of arbitrary pixels surrounding the remarked pixel P are stored in advance as a difference template group 50 in the difference template storing unit 49, values of gradation having a greater number of gradation levels than that of input data and corresponding to the above-mentioned difference template group 50 are stored in advance as a difference corresponding gradation level group 51 in the above-mentioned difference template storing unit 49. In the difference coincidence detecting unit 44, it is determined whether or not difference data in the difference template group 50 coincide with the difference data stored in the second window register 32.

If it is confirmed that the above-mentioned two difference data coincide with each other, difference data are changed to corresponding values of gradation in the difference template group, and original value of gradation of the remarked pixel is added thereto. As a result, new values of gradation can be obtained. Based on the new values of gradation, an image having a greater number of gradation levels than that of input image data is printed and reproduced.

In the above modification, difference data of image data between the remarked pixel P and surrounding pixels are obtained, and template matching with the difference template stored in advance is performed. Thus, it is possible to avoid an excessive increase in the number of templates and to reduce the size of the processing circuit. After the above-mentioned template matching using the difference templates, the gradational enhancement process exceeding 256 gradation levels is performed including gradation of intermediate density data, thereby enabling an image with smooth gradation to be output.

Figure 13:
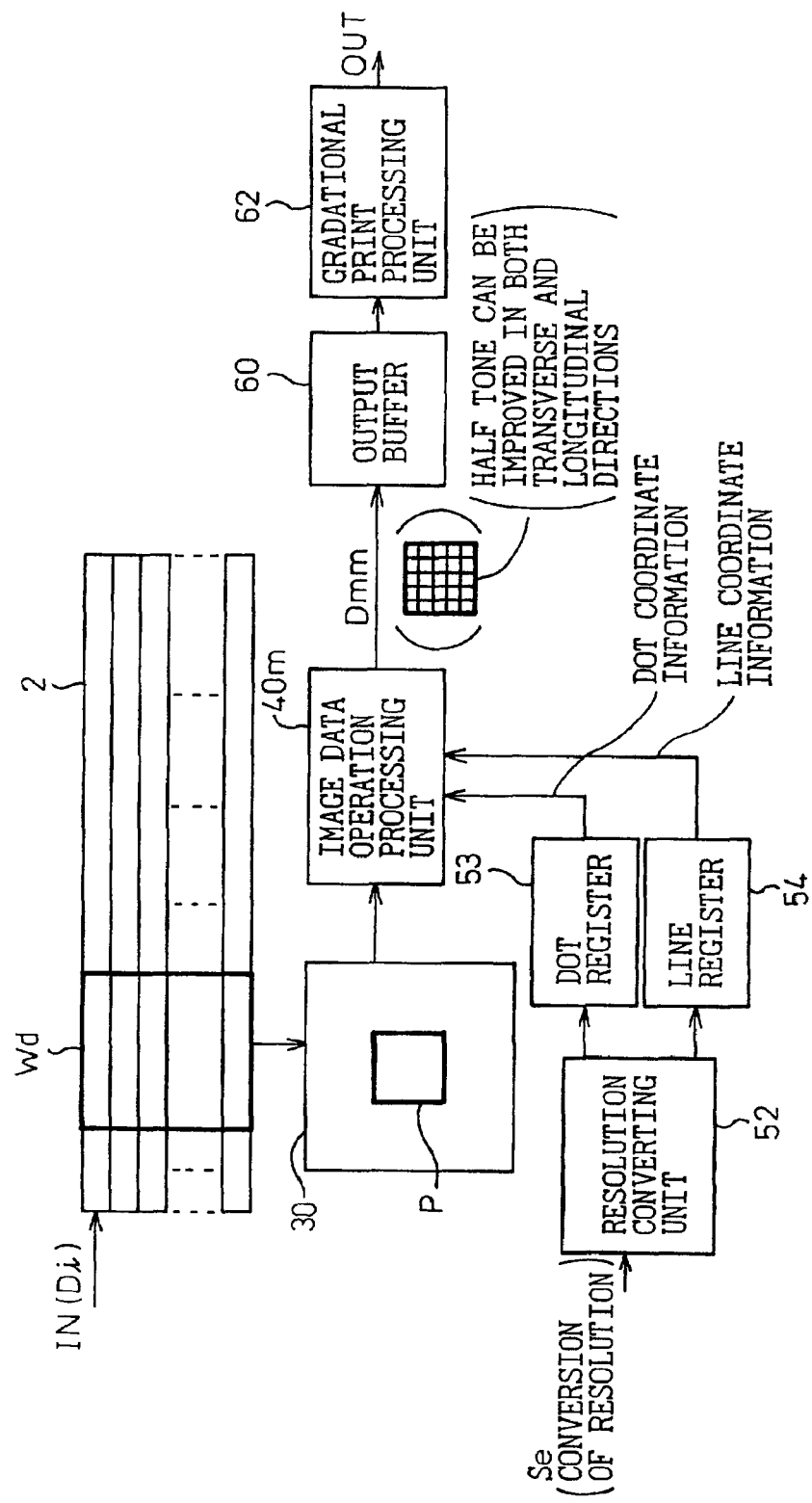
FIG. 13 is a block diagram showing the construction of a fourth preferred embodiment of the present invention.

FIG. 13 is a block diagram showing the construction of a fourth preferred embodiment (hereinafter abbreviated to the "fourth embodiment") of the present invention, and FIG. 14 is a view showing an example in which gradation and resolution are improved in output image data in the embodiment of FIG. 13. Again, schematic construction of the image reproducing apparatus of the present invention as applied to a controller in a printer system is shown here as a representative example.

In the fourth embodiment as shown in FIG. 13, a resolution converting unit 52 that converts the resolution of input image data to a resolution having higher level than the above-mentioned resolution, and a position information register that stores position information on each of a plurality of pixels of image data are newly provided. The position information register comprises a dot register 53 that stores dot coordinate information on a longitudinal position of the plurality of pixels and a line register 54 that stores line coordinate information on a transverse position of the above-mentioned pixels.

In the fourth embodiment of FIG. 13, in place of the image data operation processing unit 40 in the above-described first embodiment of FIG. 2, an image data operation processing unit 40m is provided which calculates variation of gradation of pixels in region surrounding the remarked pixel P stored in the register 30 while changing each position of the plurality of pixels stored in the dot register 53 and the line register pixel by pixel. The image data operation processing unit 40m has the function of generating half tone improved output image data Dmm in which half tone is improved in both the longitudinal direction and the transverse direction.

Components other than above-mentioned resolution converting unit 52, dot register 53, line register 54 and image data operation processing unit 40m, are same as in the above-described first embodiment, so that an explanation of these components is not repeated here.

In the fourth embodiment of FIG. 13, the dot register 53 and the line register 54 are provided in accordance with magnification of resolution (rate of resolution conversion, defined by magnification signal Se) at each position of the plurality of pixels. Gradation level of each pixel in output image is determined in accordance with the position information (dot coordinates information and line coordinates information) of each of the plurality of pixels and the content of the register 30. In this case, the gradation level is determined by executing the operational process while changing the positions of output pixels one by one.

As a result, output image data in which both resolution and gradation (density) are improved can be obtained. More specifically, as shown in FIG. 14, in the same manner as in the above-described improvement of gradation levels in the transverse direction shown in FIG. 3, on the basis of gradation levels of a specified portion (that is, the portion containing the remarked pixel P) extracted from input image data (upper half part of FIG. 14), gradation which further divides these gradation levels is newly generated (lower half part of FIG. 14). The gradation newly generated in this manner contains a greater number of gradation levels than that of input image data Di.

Further, as shown in FIG. 14, in addition to dividing step between gradation levels into five in the transverse direction, resolution in the longitudinal direction can be divided into five (lower half part of FIG. 14). In this way, output image data can be obtained in which not only the gradational enhancement process for increasing the number of gradation levels, but also the resolution enhancement process for increasing the resolution has been carried out.

Figure 15:
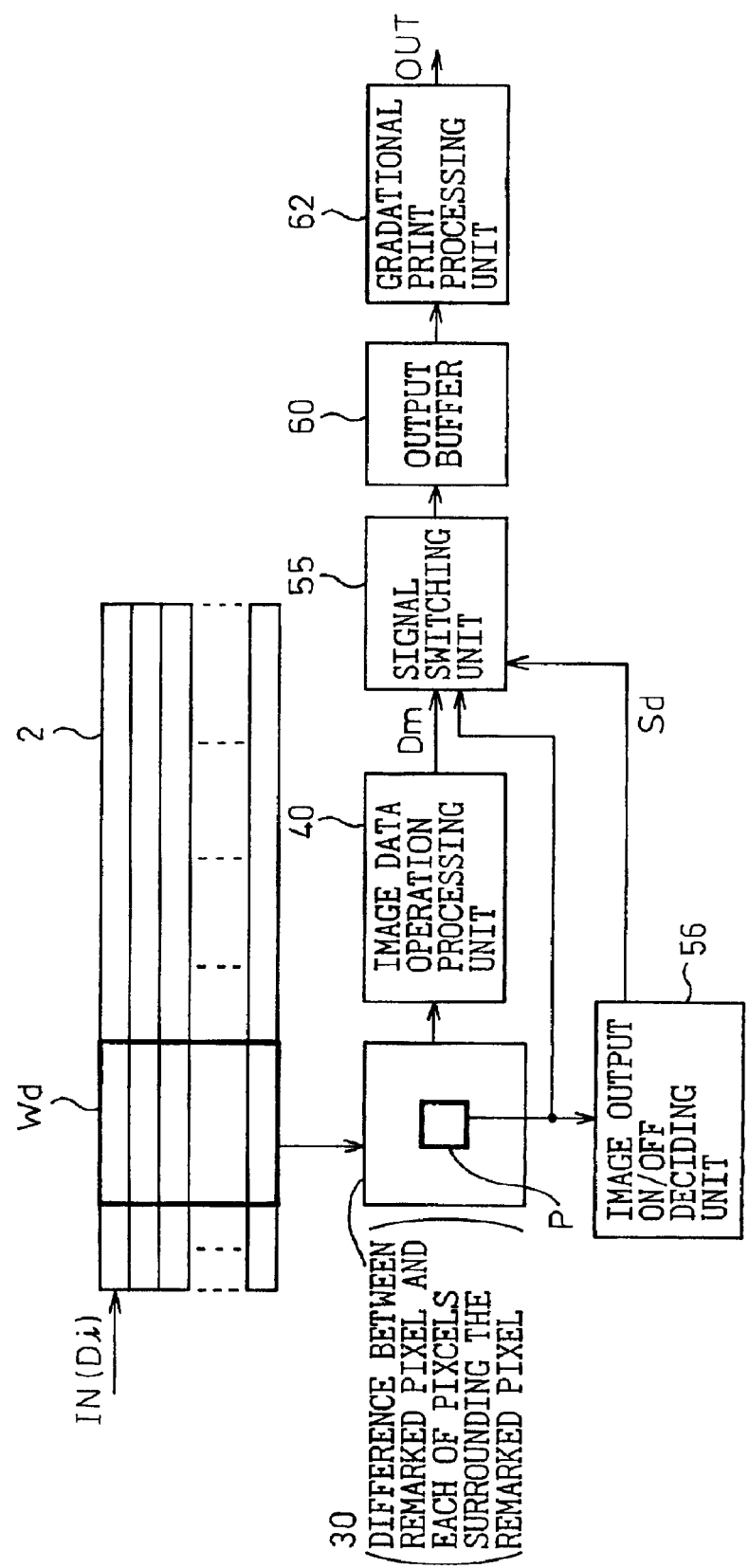
FIG. 15 is a block diagram showing the construction of a fifth preferred embodiment of the present invention.

FIG. 15 is a block diagram showing the construction of a fifth preferred embodiment (hereinafter abbreviated to the "fifth embodiment") of the present invention. Again, schematic construction of the image reproducing apparatus of the present invention as applied to a controller in a printer system is shown here as a representative example.

In the fifth embodiment as shown in FIG. 15, an image output on/off deciding unit 56 that determines whether or not an image having gradation enhancement processing performed thereon is to be output, and a signal switching unit 55 that selects, according to the result of determination of the image output on/off deciding unit 56, whether or not an image including half tone improved output image data Dmm is to be output, are newly provided. The image output on/off deciding unit 56 has the function of determining whether or not an image having a greater number of gradation levels than that of input image data (that is, an image having gradation enhancement processing performed) is to be output or not, depending on whether or not gradation levels of image data in the portion containing the remarked pixel P are within a predetermined range.

Components other than the above-mentioned image output on/off deciding unit 56 and signal switching unit 55, are same as in the above-described first embodiment, so that an explanation of these components is not repeated here.

In the fifth embodiment of FIG. 15, if gradation levels of image data in the portion containing the remarked pixel P are within the predetermined range, the image output on/off deciding unit 56 is turned on to operate the signal switching unit 55 and an image having a greater number of gradation levels than that of input image data is printed and output.

On the other hand, if gradation levels of image data in the portion containing the remarked pixel P are not within the predetermined range, the image output on/off deciding unit 56 is turned off and the signal switching unit 55 is made non-operational so that an image having gradation of input image data (that is, image not subjected to the gradational enhancement process) is printed and reproduced.

In the above-described fifth embodiment, special attention is paid to the fact that the effect of improvement obtained by the gradational enhancement process of the present invention is particularly high in the portion in which the step between different gradation levels is visible such as highlight portion (that is, low density portion). In other words, in many cases, gradational enhancement process of the present invention has little merit in the high density portion in which luminance of image data is low.

Therefore, in the above-mentioned fifth embodiment, gradational enhancement process is performed not on gradation levels of all region, but only on gradation levels within the range in which effect of gradation enhancement process can be obtained. With this construction, the amount of processing of image data is decreased so that process time for conducting the gradational enhancement process using software can be reduced.

Figure 16:
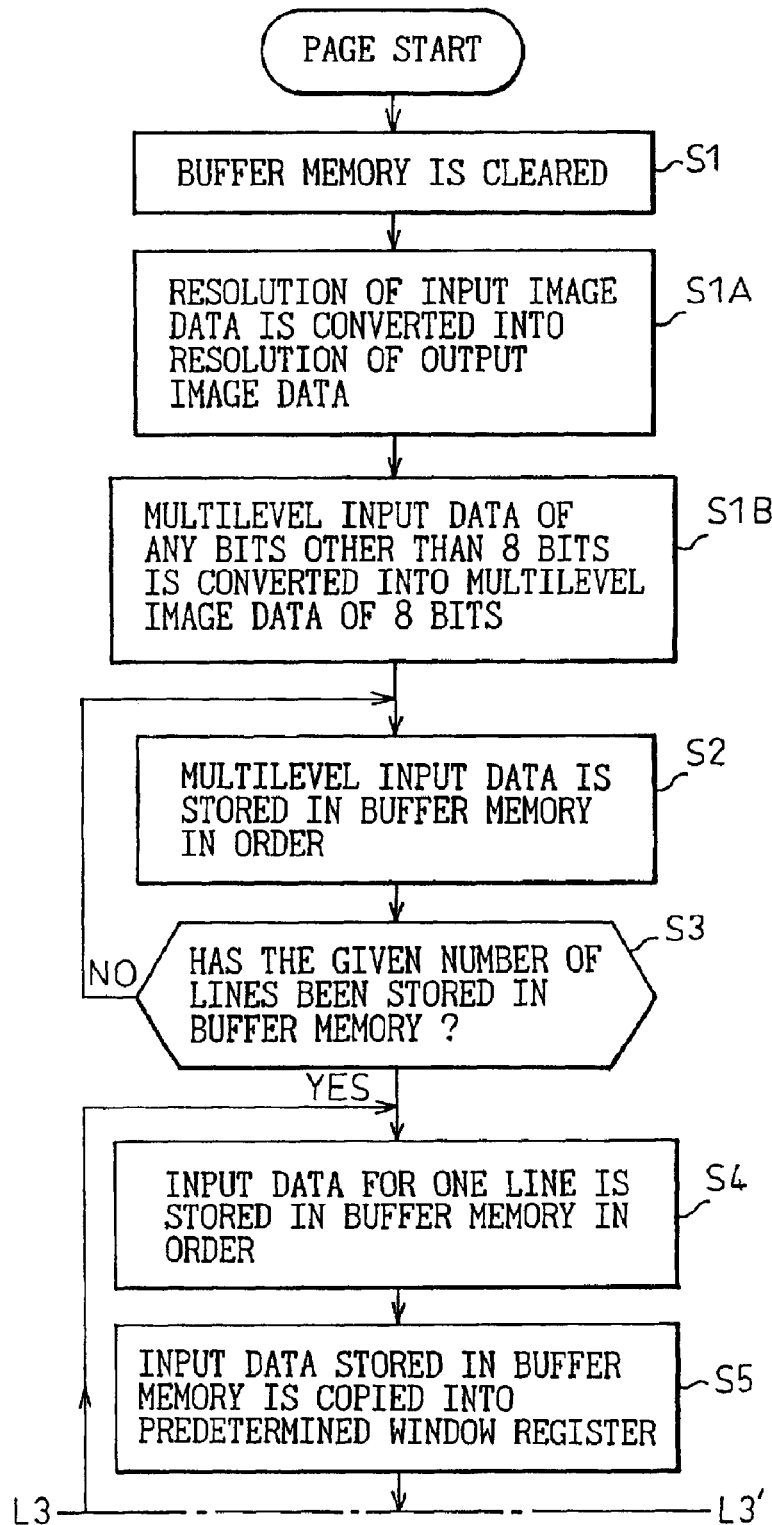
FIG. 16 is a flow chart (1) useful for explaining the operation of the embodiment of the present invention when plural kinds of image data are input.
Figure 17:
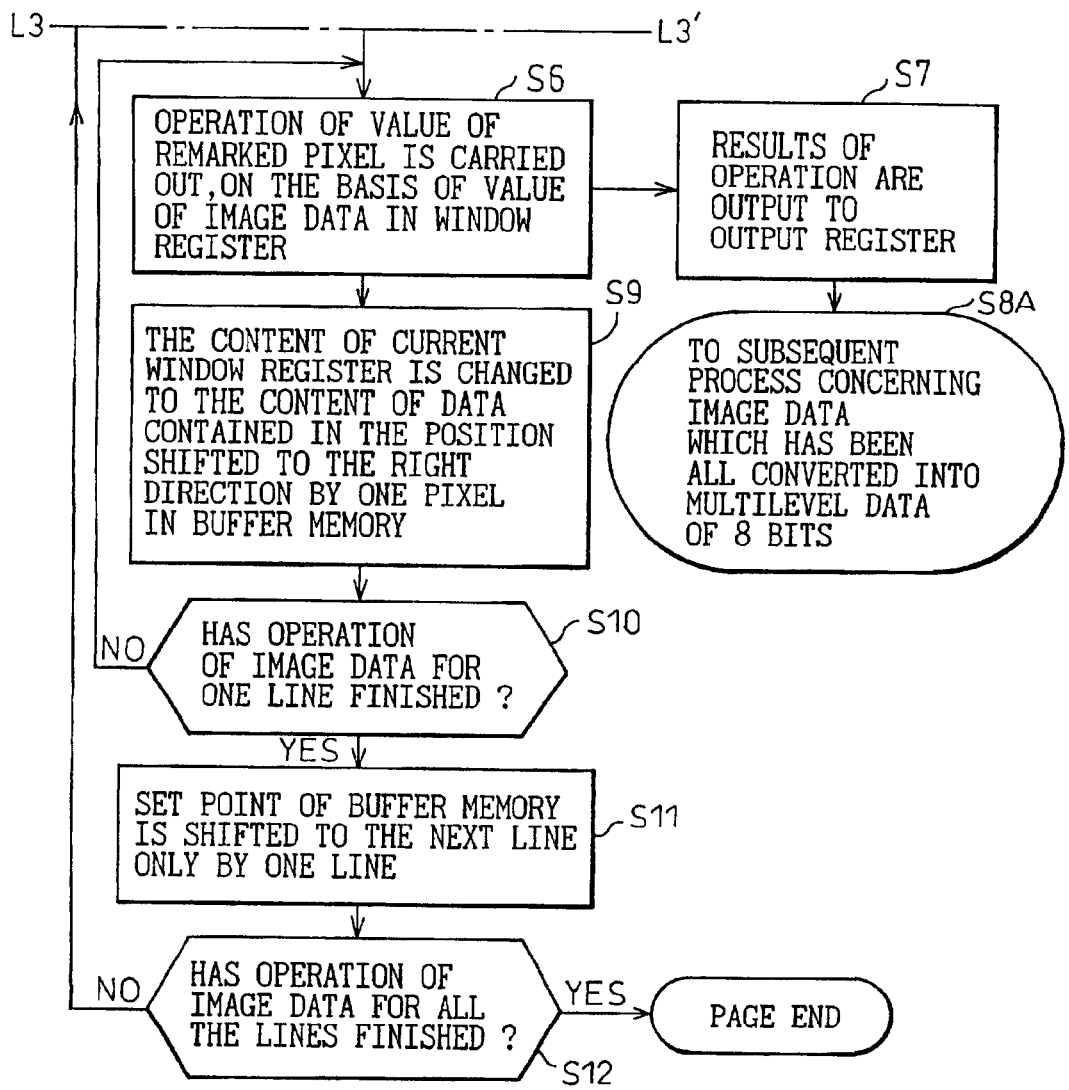
FIG. 17 is a flow chart (2) useful for explaining the operation of the embodiment of the present invention when plural kinds of image data are input.

FIGS. 16 and 17 are flow charts (1) and (2) useful for explaining the operation of the embodiment of the present invention when plural kinds of image data are input. Here, specific processing flow executed using an image reproducing program including the above-mentioned gradational enhancement process is explained in detail for the case in which multilevel image data (for example, image data of 8 bits) and non-multilevel image data (for example, image data of 2 bits) are mixedly input.

In the flow chart of FIG. 16, step S1A and step S1B are additionally inserted between step S1 and step S2 of the above-described FIG. 4. On the other hand, in the flow chart of FIG. 17, step S8 in the above-described FIG. 5 is replaced by step S8A.

Since the content of processing at steps other than the above-mentioned step S1A, step S1B and step S8A (that is, step S1 to step S12), is the same as the content of processing at steps in the above-described FIGS. 4 and 5, an explanation thereof is not repeated here.

At step S1A of FIG. 16, input multilevel (8 bit) image data and two-level (2 bit) image data are both converted to the resolution of output image data. This is because, in order to receive both 8 bit image data and 2 bit image data in the same output buffer, all image data input to the output buffer need to have same level of resolution.

Further, at step S1B, if input data are 2 bit image data, the 2 bit image data are converted to 8 bit image data. Again, in order to receive both 8 bit image data and 2 bit image data in the same output buffer, all image data input to the output buffer need to have same bit number. More specifically, interval between "0" and "1" can be divided at equal interval to generate 255 (256−1) new values, to thereby convert 2 bit image data to 8 bit image data.

Further, at step S8A of FIG. 17, after all the input data are converted to 8 bit multilevel image data, print processing (subsequent process) of an image having increased number of gradation levels over that of input data is performed.

As described above, even if multilevel image data and non-multilevel image data are mixedly input, the gradational enhancement process of the present invention can be easily executed by converting the non-multilevel image data to multilevel image data. Although the case where only two kinds of image data are input is explained in FIGS. 16 and 17, the present invention is not limited to this case. For example, if three or more kinds of image data with different bit numbers are input, these image data can be converted to image data with the same bit numbers, and similar gradational enhancement process can be thereby executed.

Figure 18:
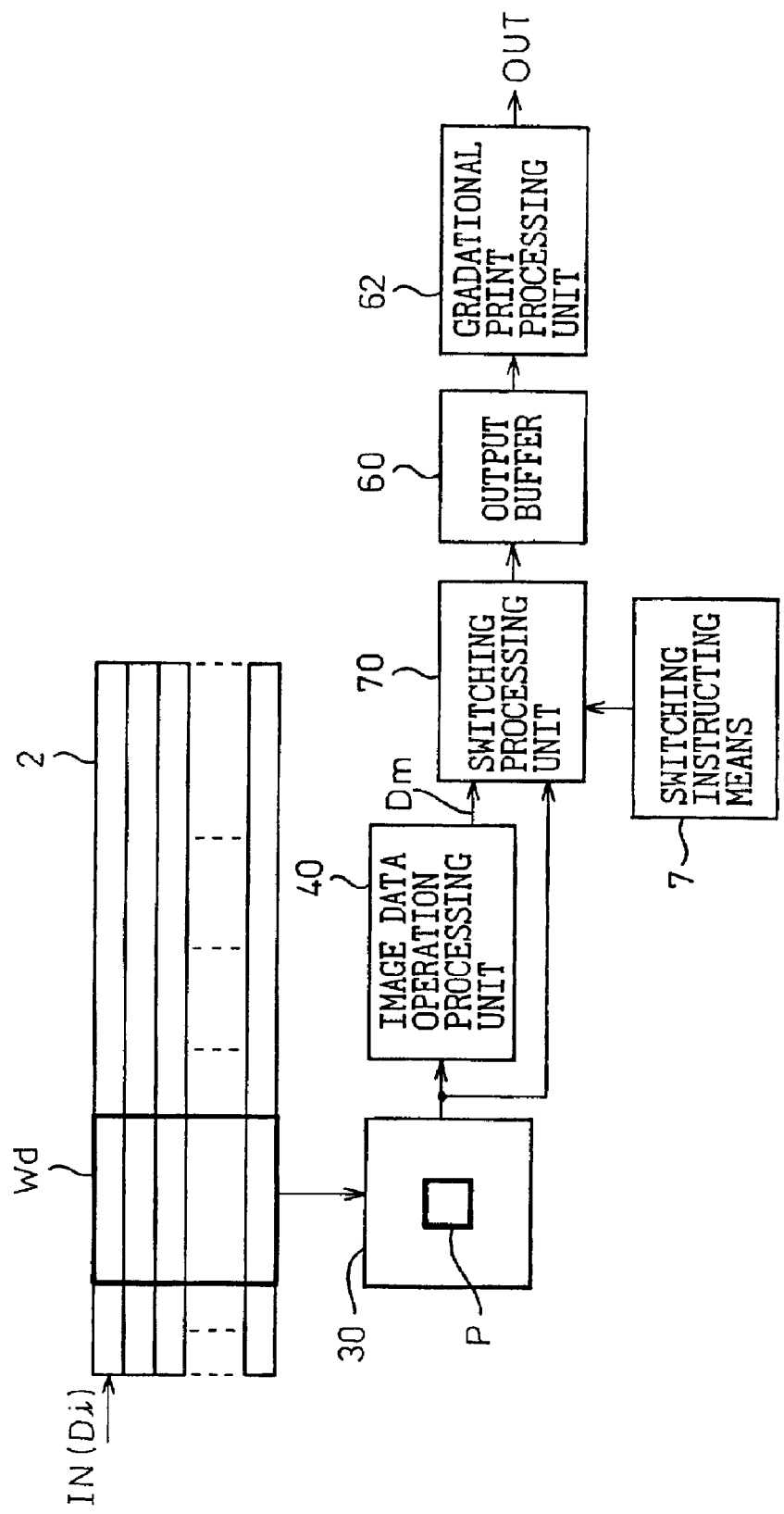
FIG. 18 is a block diagram showing the construction of a sixth preferred embodiment of the present invention.
Figure 19:
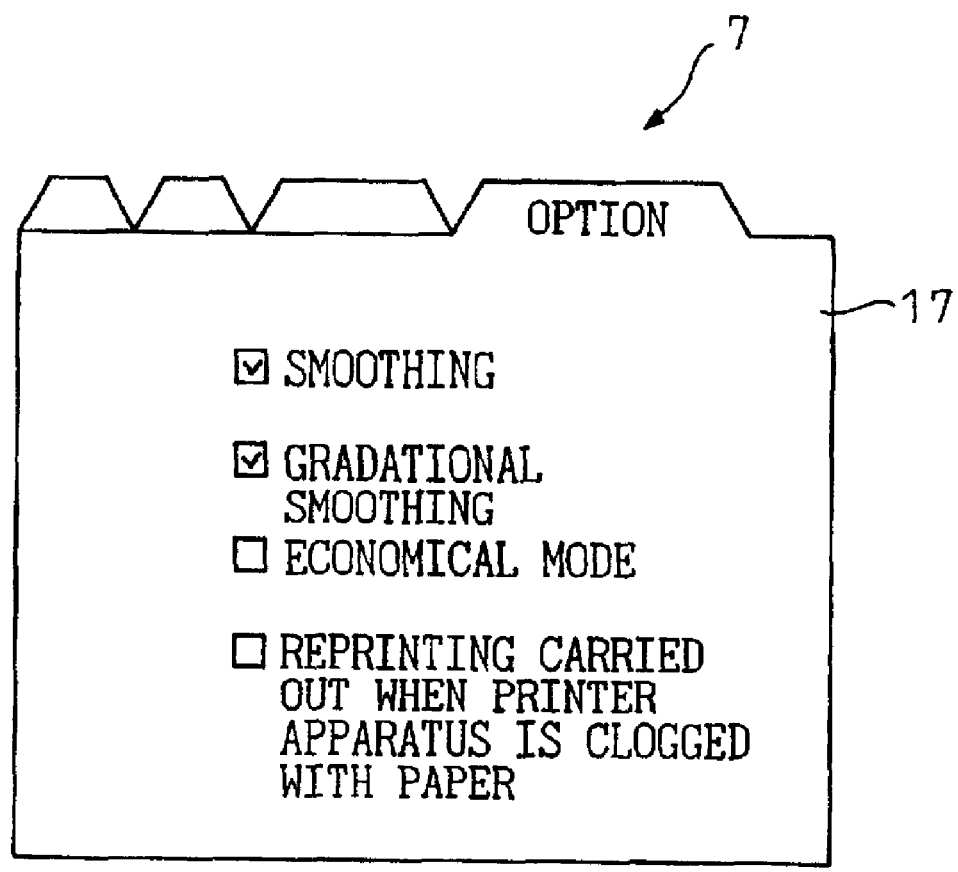
FIG. 19 is a front view showing a specific example of the switching instructing means of FIG. 18.

FIG. 18 is a block diagram showing the construction of a sixth preferred embodiment (hereinafter abbreviated to the "sixth embodiment") of the present invention, and FIG. 19 is a front view showing a specific example of the switching instructing means of FIG. 18. Again, a schematic construction of the image reproducing apparatus of the present invention as applied to a controller in a printer system is shown here as a representative example.

In the sixth embodiment of FIG. 18, switching instructing means 7 that instruct a switching operation as to whether an image having the gradation enhancement process performed on input image data should be output or an image that has the same number of gradation levels as input image data should be output, and a switching processing unit 70 that selects, in response to the content of the switching instructing means 7, whether or not an image containing half tone improved output image data Dm is to be output, are newly provided. In this embodiment, the user or the like can select arbitrarily, by operating the switching instructing means 7 himself, whether or not gradational enhancement process should be executed in accordance with the range of gradation levels of image data in the window.

Components other than the above-mentioned switching instructing means 7 and switching processing unit 70 are same as in the above-described first embodiment, so that an explanation of these components is not repeated here.

The switching instructing means 7 in above-mentioned sixth embodiment consists of a switching function on/off control operating unit 17 composed of operating button and the like. Preferably, the switching function on/off control operating unit 17 is provided in the printer driver 102 (see FIG. 8) of the host computer 101 (see FIG. 8) to facilitate on/off control of the function of the gradation enhancement process of image data.

More specifically, in the switching function on/off control operating unit 17 of FIG. 17, four kinds of menus, that is, (1) a smoothing, (2) a gradational smoothing, (3) an economical mode, and (4) a reprinting carried out when printer apparatus is clogged (or jammed) with paper, are displayed as options in operating buttons. Among these menus, the function of the gradational enhancement process of image data is displayed by the menu named "gradational smoothing". When information as to whether or not the operating button displayed as the "gradational smoothing" is checked (in FIG. 19, checked) is transferred via the printer driver 102 to the controller 104 (see FIG. 8), data of the switching processing unit 70 are switched in response to this information to thereby turn on or off the function of the gradational enhancement process of image data.

In output image data shown in FIGS. 3 and 14 as described above, only the case in which gradation levels change one-dimensionally in the transverse direction is shown. This is solely for the sake of simplicity of explaining the gradational enhancement process of the present invention. The gradational enhancement process can be realized in a suitable manner in respective cases in which gradation varies in the longitudinal direction or in which gradation varies two-dimensionally in both the longitudinal direction and the transverse direction.

As described above, according to some typical embodiments of the present invention, an image is output that has a greater number of gradation levels than that of input image data, especially in the portion of input image data in which the step between different gradation levels is visible, so that an image smoother than input image data can be reproduced without increasing the amount of data significantly over input image data.

Therefore, it is possible to avoid an increase in process time for processing image data and to reduce the burden of upgrading processing circuits, thereby to improve the cost-performance ratio of the apparatus.

What is claimed is:
1. An image reproducing apparatus comprising:
    a buffer memory that accumulates input image data for a plurality of lines;
    an image data storing unit that extracts and stores, from the buffer memory, image data of a region of a predetermined size;
    a specified portion detecting unit that detects specified portion in which gradation of the image data varies slowly from the predetermined region of said image data stored in the image data storing unit; and an intermediate density data generating unit that generates intermediate density data composed with step smaller than the minimum value of a step between different gradation levels of said image data, based on a result of detection by said specified portion detecting unit, in said specified portion;

wherein based on the intermediate density data, an image is output and reproduced that has a greater number of gradation levels than that of said input image data.

2. An image reproducing apparatus according to claim 1, further comprising an image output processing unit that outputs, on receiving said input image data and said intermediate density data, an image having increased number of gradation levels over that of the image data.

3. An image reproducing apparatus according to claim 1, wherein, in said specified portion, gradation varies in units of the minimum value of a step between different gradation levels of said image data, and wherein luminance of said image data in said specified portion is higher than in the other portion.

4. An image reproducing apparatus according to claim 2, wherein, in said specified portion, gradation varies in units of the minimum value of a step between different gradation levels of said image data, and wherein luminance of said image data in said specified portion is higher than in the other portion.

5. An image reproducing apparatus comprising:

a buffer memory that accumulates input image data for a plurality of lines;

a register that extracts and stores, from the buffer memory, image data of a remarked pixel selected from among a plurality of pixels of said input image data, and image data of pixels in region surrounding the pixel;

an image data operation processing unit that calculates an average value of gradation of image data of said remarked pixel and image data of pixels in region surrounding said remarked pixel stored in the register; and a gradation enhancement process on/off deciding unit that detects the maximum value and the minimum value of gradation levels of image data in the region surrounding said remarked pixel, and decides whether or not enhancement process of increasing the number of gradation levels of said input image data is to be performed, depending on whether or not the difference between the maximum value and the minimum value is equal to or less than a predetermined value;

wherein if the difference between said maximum value and said minimum value is equal to or less than the predetermined value, said gradation enhancement process on/off deciding unit is turned on to output and reproduce an image having a greater number of gradation levels than that of input image data, while if the difference between said maximum value and said minimum value is greater than the predetermined value, said gradation enhancement process on/off deciding unit is turned off to output and reproduce an image having adopted said average value as gradation level of image data of said remarked pixel.

6. An image reproducing apparatus according to claim 5, further comprising a gradational print processing unit that performs, on receiving said input image data, a printing process of either an image having increased number of gradation levels over that of the image data, or an image having adopted said average value as gradation level of image data of said remarked pixel.

7. An image reproducing apparatus according to claim 6, wherein luminance of said image data in the portion containing said remarked pixel is higher than in the other portion.

8. An image reproducing apparatus according to claim 5, wherein luminance of said image data in the portion containing said remarked pixel is higher than in the other portion.

9. An image reproducing apparatus comprising:

a buffer memory that accumulates input image data for a plurality of lines;

a register that extracts and stores, from the buffer memory, image data of a remarked pixel from among a plurality of pixels of said input image data, and image data of pixels in region surrounding the pixel;

a template storing unit that stores in advance the correspondence between arbitrary combination of said plurality of pixels and gradation having a greater number of gradation levels than that of said input image data as templates; and a coincidence detecting unit that detects whether or not a combination of a plurality of pixels in a template stored in the template storing unit coincides with the combination of said remarked pixel and pixels in region surrounding the pixel stored in the register;

wherein if coincidence of said two combinations with each other is detected, an image having a greater number of gradation levels than that of said input image data is output and reproduced based on corresponding gradation in said template.

10. An image reproducing apparatus according to claim 9, further comprising a gradational print processing unit that performs, on receiving said input image data, a printing process of an image having increased number of gradation levels over that of the image data.

11. An image reproducing apparatus according to claim 10, wherein luminance of said image data in the portion containing said remarked pixel is higher than in the other portion.

12. An image reproducing apparatus according to claim 9, wherein luminance of said image data in the portion containing said remarked pixel is higher than in the other portion.

13. An image reproducing apparatus comprising:

a buffer memory that accumulates input image data for a plurality of lines;

a first register that extracts and stores, from the buffer memory, image data of a remarked pixel from among a plurality of pixels of said input image data, and image data of pixels in region surrounding the pixel;

a second register that sets the value of said remarked pixel as a reference value, and stores a result of subtraction of said value of said remarked pixel from value of pixels in said surrounding region as difference data;

a difference template storing unit that stores in advance the correspondence between difference data of arbitrary pixel in said surrounding region and gradation having a greater number of gradation levels than that of input image data as difference template; and a difference coincidence detecting unit that detects whether or not difference data in difference template stored in said difference template storing unit coincides with the difference data stored in said second register;

wherein if it is detected that the two difference data coincide with each other, an image having a greater number of gradation levels than that of said input image data is output and reproduced based on the corresponding gradation in said difference template.

14. An image reproducing apparatus according to claim 13, further comprising a gradational print processing unit that performs, on receiving said input image data, a printing process of an image having increased number of gradation levels over that of the image data.

15. An image reproducing apparatus according to claim 14, wherein luminance of said image data in the portion containing said remarked pixel is higher than in the other portion.

16. An image reproducing apparatus according to claim 13, wherein luminance of said image data in the portion containing said remarked pixel is higher than in the other portion.

17. An image reproducing apparatus comprising:
a buffer memory that accumulates input image data for a plurality of lines;
a resister that extracts and stores, from the buffer memory, image data of a remarked pixed selected from among a plurality of pixels of said input image data, and image data of pixels in region surrounding the pixel; and
an image data operation processing unit that detects a portion containing said remarked pixel in which gradation of the image varies slowly by calculating variation of gradation of image data in said surrounding region stored in the register, and generates intermediate density data composed with step smaller than the minimum value of a step between different gradation levels of image data;
wherein based on the intermediate density data, an image is output and reproduced that has a greater number of gradation levels than that of said input image data.

18. An image reproducing apparatus according to claim 17, further comprising a gradational print processing unit that performs, on receiving said input image data and said intermediate density data, a printing process of an image having increased number of gradation levels over that of the image data.

19. An image reproducing apparatus according to claim 18, wherein, in said portion containing said remarked pixel, gradation varies in units of the minimum value of a step between different gradation levels of said image data, and wherein luminance of said image data in said portion containing said remarked pixel is higher than in the other portion.

20. An image reproducing apparatus according to claim 18, further comprising:
a resolution converting unit that converts a resolution of said input image data to a resolution of higher level than the original resolution; and
a position information register that stores position information on the position of each of said plurality of pixels;
wherein, while the position of each of said plurality of pixels stored in the position information register is being shifted pixel by pixel, said image data operation processing unit is operated so as to output an image which has the resolution of higher level than that of the input image data, and which has a greater number of gradation levels than that of the image data.

21. An image reproducing apparatus according to claim 18, further comprising:
an image output on/off deciding unit that decides whether or not an image having a greater number of gradation levels than that of said input image data is to be output, depending on whether or not a gradation level of image data in a region containing said remarked pixel is within a predetermined range;
wherein, if the gradation level of image data in the region containing said remarked pixel is within the predetermined range, the image output on/off deciding unit is turned on to output an image having a greater number of gradation levels than that of said input image data, and on the other hand, if the gradation level of image data in the region containing said remarked pixel is not within the predetermined range, the image output on/off deciding unit is turned off to output an image having the number of gradation levels maintained at that of said input image data.

22. An image reproducing apparatus according to claim 18, further comprising switching instructing means for instructing a switching operation as to whether an image having a greater number of gradation levels than that of said input image data is to be output, or an image having number of gradation levels maintained at that of said input image data is to be output.

23. An image reproducing apparatus according to claim 5, further comprising:
a resolution converting unit that converts a resolution of said input image data to a resolution of higher level than the original resolution; and
a position information register that stores position information on the position of each of said plurality of pixels;
wherein, while the position of each of said plurality of pixels stored in the position information register is being shifted pixel by pixel, said image data operation processing unit is operated so as to output an image which has the resolution of higher level than that of the input image data, and which has a greater number of gradation levels than that of the image data.

24. An image reproducing apparatus according to claim 17, further comprising:
an image output on/off deciding unit that decides whether or not an image having a greater number of gradation levels than that of said input image data is to be output, depending on whether or not a gradation level of image data in a region containing said remarked pixel is within a predetermined range;
wherein, if the gradation level of image data in the region containing said remarked pixel is within the predetermined range, the image output on/off deciding unit is turned on to output an image having a greater number of gradation levels than that of said input image data, and on the other hand, if the gradation level of image data in the region containing said remarked pixel is not within the predetermined range, the image output on/off deciding unit is turned off to output an image having the number of gradation levels maintained at that of said input image data.

25. An image reproducing apparatus according to claim 17, further comprising switching instructing means for instructing a switching operation as to whether an image having a greater number of gradation levels than that of said input image data is to be output, or an image having number of gradation levels maintained at that of said input image data is to be output.

26. An image reproducing apparatus according to claim 17, wherein, in said portion containing said remarked pixel, gradation varies in units of the minimum value of a step between different gradation levels of said image data, and wherein luminance of said image data in said portion containing said remarked pixel is higher than in the other portion.

27. An image reproducing apparatus according to claim 26, further comprising:

a resolution converting unit that converts a resolution of said input image data to a resolution of higher level than the original resolution; and a position information register that stores position information on the position of each of said plurality of pixels;

wherein, while the position of each of said plurality of pixels stored in the position information register is being shifted pixel by pixel, said image data operation processing unit is operated so as to output an image which has the resolution of higher level than that of the input image data, and which has a greater number of gradation levels than that of the image data.

28. An image reproducing apparatus according to claim 26, further comprising:

an image output on/off deciding unit that decides whether or not an image having a greater number of gradation levels than that of said input image data is to be output, depending on whether or not a gradation level of image data in a region containing said remarked pixel is within a predetermined range;

wherein, if the gradation level of image data in the region containing said remarked pixel is within the predetermined range, the image output on/off deciding unit is turned on to output an image having a greater number of gradation levels than that of said input image data, and on the other hand, if the gradation level of image data in the region containing said remarked pixel is not within the predetermined range, the image output on/off deciding unit is turned off to output an image having the number of gradation levels maintained at that of said input image data.

29. An image reproducing apparatus according to claim 26, further comprising switching instructing means for instructing a switching operation as to whether an image having a greater number of gradation levels than that of said input image data is to be output, or an image having number of gradation levels maintained at that of said input image data is to be output.

30. An image reproducing method comprising the steps of:

accumulating input image data for a plurality of lines in a buffer memory;

extracting and storing from the buffer memory image data of region of a predetermined size;

detecting a specified portion in which gradation of the image data varies slowly from the predetermined region of the stored image data;

generating intermediate density data composed with step smaller than the minimum value of a step between different gradation levels of said image data, based on the detection result of the specified portion, in the specified portion; and outputting and reproducing, based on the intermediate density data, an image having a greater number of gradation levels than that of said input image data.

31. A computer readable storage medium storing:

means for causing image data of region of a predetermined size to be extracted and stored from a buffer memory storing input image data for a plurality of lines;

means for causing a specified portion where gradation of the image data varies slowly to be detected from the predetermined region of the stored image data;

means for causing intermediate density data composed with step smaller than the minimum value of a step between different gradation levels of said image data to be generated in said specified portion; and means for outputting an image having a greater number of gradation levels than that of said input image data based on the intermediate density data.

* * * * *